(12) United States Patent (10) Patent No.: US 7,664,729 B2
Klein et al. (45) Date of Patent: Feb. 16, 2010

(54) CAPTURE, AGGREGATION AND/OR VISUALIZATION OF STRUCTURAL DATA OF ARCHITECTURES

(75) Inventors: Frederic M. Klein, Fischbach (DE); Eckehard Stolz, Munich (DE); Rupert Rebentisch, Frankfurt am Main (DE)

(73) Assignee: Accenture Global Services GmbH, Schaffhausen (CH)

( * ) Notice: Subject to any disclaimer, the term of this patent is extended or adjusted under 35 U.S.C. 154(b) by 607 days.

(21) Appl. No.: 10/930,716

(22) Filed: Aug. 30, 2004

(65) Prior Publication Data

US 2005/0138160 A1 Jun. 23, 2005

(30) Foreign Application Priority Data

Aug. 28, 2003 (EP) .................... 03019518

(51) Int. Cl.
*G06F 7/00* (2006.01)
*G06F 17/00* (2006.01)

(52) U.S. Cl. ................... 707/2; 707/101; 717/105; 715/234

(58) Field of Classification Search ................ 707/10, 707/2, 101; 717/105; 715/234
See application file for complete search history.

(56) References Cited

U.S. PATENT DOCUMENTS

| | | | | |
|---|---|---|---|---|
| 4,791,561 A | * | 12/1988 | Huber | 707/1 |
| 5,201,046 A | * | 4/1993 | Goldberg et al. | 707/100 |
| 5,787,410 A | * | 7/1998 | McMahon | 707/1 |
| 5,857,204 A | * | 1/1999 | Lordi et al. | 707/202 |
| 5,987,442 A | | 11/1999 | Lewis et al. | |
| 5,987,472 A | * | 11/1999 | Serafin | 707/104.1 |
| 6,118,936 A | | 9/2000 | Lauer et al. | |
| 6,233,578 B1 | * | 5/2001 | Machihara et al. | 707/10 |
| 6,609,132 B1 | * | 8/2003 | White et al. | 707/103 R |
| 6,618,732 B1 | * | 9/2003 | White et al. | 707/103 R |
| 6,735,593 B1 | * | 5/2004 | Williams | 707/102 |
| 7,111,233 B1 | * | 9/2006 | Ballantyne et al. | 707/E17.117 |
| 2003/0037039 A1 | * | 2/2003 | Mah et al. | 707/1 |
| 2003/0154191 A1 | * | 8/2003 | Fish et al. | 707/2 |
| 2004/0078373 A1 | * | 4/2004 | Ghoneimy et al. | 707/10 |
| 2005/0039033 A1 | * | 2/2005 | Meyers et al. | 713/193 |

FOREIGN PATENT DOCUMENTS

WO WO 00/14618 3/2000

* cited by examiner

*Primary Examiner*—Vincent Boccio
(74) *Attorney, Agent, or Firm*—Fish & Richardson P.C.

(57) ABSTRACT

Computerized techniques, systems, and computer program products for a structured, hierarchical model for capturing, aggregating, and/or visualizing structural data of architectures of technical equipment (e.g., IT architectures). The techniques, systems and/or computer program products may include at least one data capture engine adapted to capture and aggregate data based on a structured, hierarchical model; a display engine to generate a plurality of different displays of the captured data in dependency of the structured hierarchical model, where the data capture engine includes at least one database to store the data according to the structured, hierarchical model.

19 Claims, 20 Drawing Sheets

FIG. 15A (11)

| Row_id | Model_Type | Model_Version | Active_Flag | Description |
|---|---|---|---|---|
| "DK-00000000-00000102" | "Vision" | "0.1" | "Y" | "This is the standard Function Model ..." |

FIG. 15B (12)

| Model_rid | Node_Class_Unique_ID |
|---|---|
| "DK-00000000-00000102" | "Vision Group Level 1-3" |
| "DK-00000000-00000102" | "Vision Function" |

FIG. 15C (13)

| model_rid | Node_Class_rid | Node_type | User_type | Hierarchy_id | Unique_id | Parent_unique_id | Display_id |
|---|---|---|---|---|---|---|---|
| "DK-00000000-00000102" | "DK-00000000-00000242" | "node" | "Group" | "00400A001" | "E1001" | "E10" | "E1001" |
| "DK-00000000-00000102" | "DK-00000000-00000243" | "leaf" | "Function" | "00400A001001" | "E100101" | "E1001" | "E100101" |
| "DK-00000000-00000102" | "DK-00000000-00000243" | "leaf" | "Function" | "00400A001002" | "E100102" | "E1001" | "E100102" |
| "DK-00000000-00000102" | "DK-00000000-00000243" | "leaf" | "Function" | "00400A001003" | "E100103" | "E1001" | "E100103" |

FIG. 15D (31)

| Model_rid | Display_unique_id | Is_default | Description |
|---|---|---|---|
| "DK-00000000-00000102" | "Vision_Std" | "Y" | "This is the standard Display for ..." |

32 →

| Display_rid | Node_rid | Backgrnd | Shape_Type | order | top | left | width | height | color | Label |
|---|---|---|---|---|---|---|---|---|---|---|
| "DK-00000000-00000804" | "DK-00000000-00000503" | "N" | "Rectangle" | 2 | 425 | 295 | 57 | 12 | #ffffff | |
| "DK-00000000-00000804" | "DK-00000000-00000504" | "N" | "Rectangle" | 1 | 425 | 360 | 57 | 12 | #ffffff | |
| "DK-00000000-00000804" | "DK-00000000-00000505" | "N" | "Rectangle" | 8 | 560 | 295 | 57 | 12 | #cc66cc | |
| "DK-00000000-00000804" | "DK-00000000-00000506" | "N" | "Rectangle" | 5 | 560 | 360 | 57 | 12 | #ffffff | |

| Domain_rid | Reference_rid | Complex_key | Value | Value_num |
|---|---|---|---|---|
| "DK-00000000-00000111" | "DK-00000000-00000503" | "" | "Abwicklung" | 0.0 |
| "DK-00000000-00000112" | "DK-00000000-00000503" | "" | "Funktionen zur Unterstützung der ..." | |
| "DK-00000000-00000111" | "DK-00000000-00000504" | "" | "Internet" | 0.0 |
| "DK-00000000-00000112" | "DK-00000000-00000504" | "" | "Internet-Kanal zur Unterstützung ..." | 0.0 |

| Reference_rid | Attribute_Name | Date_Type | Attached_to | Lov_group | Mandatory | Default | Edit_Field | Display_Name | Hidden |
|---|---|---|---|---|---|---|---|---|---|
| "DK-00000000-00000243" | "Name_D" | "string" | "node" | "" | "Y" | "N" | "SLE" | "Funktionsname" | "N" |
| "DK-00000000-00000243" | "Descr_D" | "string" | "node" | "" | "Y" | "N" | "MLE" | "Beschreibung" | "N" |
| "DK-00000000-00000707" | "Description" | "string" | "mapping" | "" | "Y" | "N" | "MLE" | "Abdeckung" | "N" |
| "DK-00000000-00000707" | "Implementation" | "lov" | "mapping" | "Implements" | "N" | "N" | "MLE" | "Implementierungsgrad" | "N" |

| Node_Class_Unique_id | N1_Model_type | N2_Unique_id | N2_Model_type | Mapping_class_name |
|---|---|---|---|---|
| "Vision Function" | "Function" | "Application" | "Application" | "Functional Mapping" |
| "Application" | "Application" | "Application" | "Application" | "App-App Interface" |

| N1_Unique_id | N1_Model_type | N2_Unique_id | N2_Model_type | N1_speedlink | N2_speedlink |
|---|---|---|---|---|---|
| "A010102" | "Function" | "DBD" | "Application" | "A010102.Function" | "DBD.Application" |
| "A010103" | "Function" | "DBD" | "Application" | "A010103.Function" | "DBD.Application" |
| "A010104" | "Function" | "DOL" | "Application" | "A010104.Function" | "DOL.Application" |
| "A010105" | "Function" | "DOL" | "Application" | "A010105.Function" | "DOL.Application" |

| Lov_group | Lov_order | code | decode | comment |
|---|---|---|---|---|
| "Implements" | 0 | "IMPL01" | "Implements Function" | "Used to specify how function is implemented" |
| "Implements" | 1 | "IMPL02" | "Calls other Application" | "Used to specify how function is implemented" |
| "Cost Types" | 0 | "COST01" | "Production" | "" |
| "Cost Types" | 1 | "COST02" | "Maintenance" | "" |

| Range_group | item_order | Item_name | Range_low | Range_high | Range_key | Range_op | Range_color |
|---|---|---|---|---|---|---|---|
| "Redundancy" | 0 | "low" | 1 | 2.9 | | | "#3366ff" |
| "Redundancy" | 1 | "med" | 3 | 5.9 | | | "#003366" |
| "Redundancy" | 2 | "high" | 6 | MAX | | | "#003333" |
| "Vendor" | 0 | "SAP" | | | "SAP" | Begins_with | "Green" |
| "Vendor" | 0 | "Eigenentw" | | | "Eigenentwicklung" | Not_equal | "Blue" |

| Query_name | Display_id | label | popup | url | size | Range_group | Sql_statement | comment |
|---|---|---|---|---|---|---|---|---|
| "Fingerprint" | "Vision_Std" | "Name_D" | "Descr_D" | "FunctionDetail.aspx?Func=" | 100% | "Redundancy" | "SELECT node.unique_id AS" | "Shows the re…" |
| "Fingerprint_small" | "Vision_Std" | "unique_id" | "Name_D" | "FunctionDetail.aspx?Func=" | 34% | "Redundancy" | "SELECT node.unique_id AS" | "Shows the re…" |

FIG. 15L

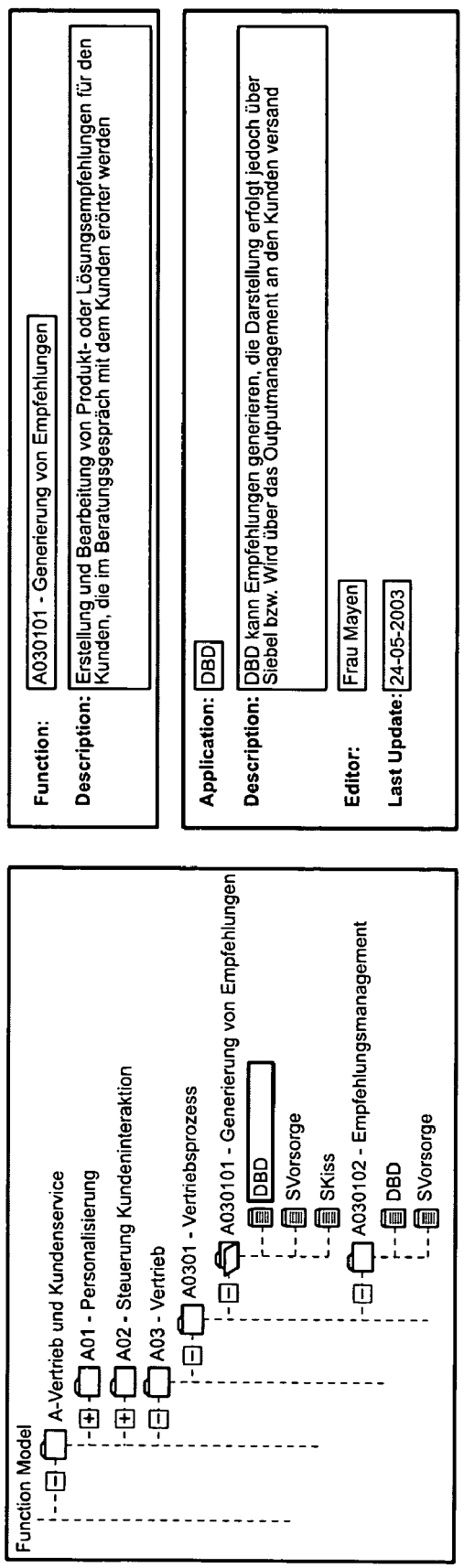
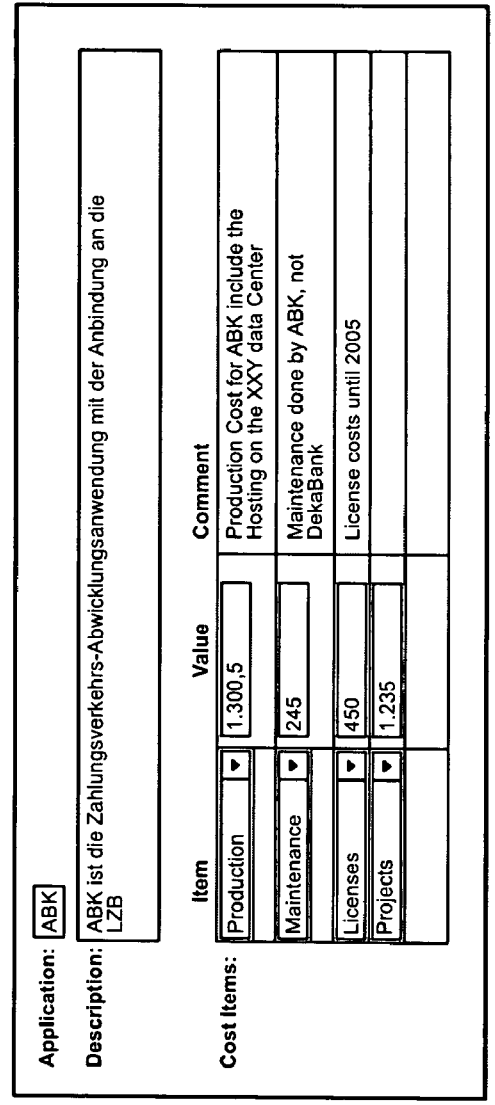
FIG. 17A
FIG. 17B

CAPTURE, AGGREGATION AND/OR VISUALIZATION OF STRUCTURAL DATA OF ARCHITECTURES

CLAIM OF PRIORITY

This application claims priority under 35 USC § 119(a)-(d) to European Patent Application Serial No. 03 019 518.4, filed on Aug. 28, 2003, the entire contents of which are hereby incorporated by reference.

BACKGROUND

The present invention relates to systems and techniques for capturing, aggregating and/or visualizing structural data of architectures of technical equipment (e.g., information technology (IT) architectures).

In general, organizations lack a clear understanding of how their IT architecture is aligned with demands of their business. An IT architecture generally comprises complex, interdependent structures that are in a perpetual state of change and cannot be easily analyzed and/or modified. For example, some desired functionality may be implemented multiple times, while other functions are not implemented. This may occur, for example, because there may be a misconception as to what has been implemented and how that has been implemented. Thus, organizations may be unable to quickly understand the interrelations between multiple entities, analyze the data associated with these interrelationships, and deduce appropriate decisions based on this analysis because of a lack of a correlation between their IT architecture and the demands of their business.

The availability of accurate data for an IT architecture and applications in the architecture for an entire organization may be limited. Much of the information relating to architectural structures may be distributed over a wide range of business units and may exist only in the heads of a group of designers, who might not coordinate information among themselves. Accurate application details may be available only from the individual persons with operational responsibility for them (i.e. data may be available only for limited areas in discrete areas, and might not be interrelated with other areas such that a general overview of the structure, including functional relationships is available). In a few cases where structural overviews are available, the structural overview may be obsolete as soon as they are printed due to a rapid combined rate of change in implemented applications, organizational structures, and business functionality being delivered.

The ability to efficiently plan for, and execute, change programs in complex architectures may be limited by a capacity to adequately develop and analyze alternative approaches to achieving desired goals. Depicting an end goal might not be as much of a problem as not having the means necessary to clearly communicate individual transition steps, and associated impact and costs, along the way. Along with this, the true costs associated with changing the way requirements are fulfilled, even if a correct decision was reached, are often not apparent until the process of change is underway because some significant interdependencies may have been omitted from the analysis. This may result in excessive costs, poorly timed strategies and wasteful investments.

SUMMARY

Described herein are methods and apparatus, including computer program products, that implement capture, aggregation, and/or visualization of structural data of architectures of technical equipment, such as information technology (IT) architectures, that may provide a systematic analysis and/or easy visualization of obtained information.

According to the invention, there is provided a computerized information system for capturing, aggregating and visualizing structural data of architectures of technical equipment such as IT architectures, comprising:

at least one data capture engine for capturing and aggregating data based on a structured, hierarchical model;

a display engine for generating a plurality of different displays of the captured data in dependency of the structured hierarchical model or based on data relationship(s) supported by the structured hierarchical model.

Accordingly, the structured, hierarchical model allows for a visualisation of multiple aspects of the entire complex structure, taking into account the interdependencies existing between the various graphical models.

Moreover, IT managers can be presented with concisely filtered and packaged information based on operational data which was captured based on the structured, hierarchical model particularly along with the necessary information regarding the relationship between the specific data (e.g. what business functions and activities are being fulfilled, what are not, at what cost, by which business unit, using which applications, what data are exchanged between applications, etc.) in a meaningful, easily understandable structure or display. What if analysis and evaluation of multiple implementation scenarios (e.g. how do variable costs change over time under different architectural structures) can be, thus, preferably performed to allow for a systematic analysis of existing and future architectures and to ensure IT managers make appropriate value-based and strategic decisions.

Additionally, to facilitate a decision on changes to the existing architecture and to ease a decision making by responsible or top company management, the architectural scenarios or blueprints according to a preferred embodiment of the invention deliver maximum informational value possibly in a single view or in few views of the underlying architectural data. Graphical representation of this information maximises information density and delivers decision makers and top management the information needed to conduct their business in an easily understandable and easily communicated fashion.

According to a preferred embodiment of the invention, the data capture engine comprises at least one database for storing the data according to the structured, hierarchical model.

Preferably, the structured, hierarchical model comprises:

a model table containing one or more major attributes of the model, such as the name, type and version of the model;

a Node_Class table containing information regarding the types of nodes that the model contains; and a Node table containing the definition of each node within the model and the node's corresponding hierarchy information.

Further preferably, the model table, the Node_Class table and the Node table are linked to each other by means of respective strong links which preferably make use of a ROW-id of the respective table. A strong link according to the preferred embodiment of the invention is a link which ensures that for every record there has to be a foreign key relationship to the primary key of a record in another table and preferably makes use of a table Row-ID.

Most preferably, the structured, hierarchical model further comprises at least one of the following tables:

a Nclass_Group table defining a group of node_classes within Node_Class table which build the pool of possible nodes within a mapping;

a Domain table defining which data element types can belong to a node or to a mapping and particularly defining the data structures stored within the model;

an Attribute table containing the actual operational data attached to the node or mapping;

a Display table defining a graphical representation of a specific view of the model, wherein multiple views on the model are achieved by filtering the display information;

a Shape table defining one or more graphical parameters needed to display node information, wherein the node information preferably includes the specification of position, size and/or shape and background specifications;

a Range table containing information controlling which color selected shapes should have when displaying query results;

a Query table containing information necessary to display the result of a structured query language (SQL) statement in a model, wherein the SQL statement is preferably stored as text and follows predetermined or predeterminable conventions to ensure that a query result contains exactly the number and types of columns necessary to be processed by the application properly;

a Widget table containing information necessary to control the layout and/or content of the nodes displayed; and/or a Tree table containing information necessary to build a tree page in conjunction with the Widget table.

According to a further preferred embodiment of the invention, the data capture engine comprises a graphical user interface engine for generating graphical user interface screens based on the structured, hierarchical model, which allow to input data, in particular one or more data attributes and/or operational data, in accordance with the structured, hierarchical model; and/or define or modify or customise the structured, hierarchical model.

Preferably, the graphical user interface generates the graphical user interface screens based on the information contained at least one of the following tables: the Display table, the Shape table, the Range table and the Query table.

Further preferably, the data capture engine comprises a scenario engine for generating a visual representation of the structured, hierarchical model into a database and/or for generating a plurality of scenarios or ongoing variations of the structured, hierarchical model.

Still further preferably, the display engine comprises a visualisation engine for creating a visualisation of the structured, hierarchical model, executing user queries, merging the query results for display and/or controlling the dynamic scaling of visual output.

Most preferably, the visualisation engine:

reads one or more shapes attached to the model from the database, preferably via one or more links and/or one or more allowable shape attributes from the Attribute table, preferably via one or more links; and/or writes shape data and/or shape attribute data to an output file being preferably an output XML file.

According to the invention, there is further provided a computerized method for capturing, aggregating and visualizing structural data of architectures of technical equipment such as IT architectures, comprising the following steps:

capturing and aggregating data based on a structured, hierarchical model; and generating a plurality of different displays of the captured data in dependency of the structured hierarchical model or based on data relationship(s) supported by the structured hierarchical model.

According to a preferred embodiment of the invention, the method comprises a step of storing the data according to the structured, hierarchical model in at least one database.

Preferably, the structured, hierarchical model is defined to comprise:

a model table containing one or more major attributes of the model, such as the name, type and version of the model;

a Node_Class table containing information regarding the types of nodes that the model contains; and a Node table containing the definition of each node within the model and the node's corresponding hierarchy information.

Further preferably, the model table, the Node_Class table and the Node table are linked to each other by means of respective strong links which preferably make use of a ROW-id of the respective table.

Still further preferably, the structured, hierarchical model is defined to further comprise at least one of the following tables:

a Nclass_Group table defining a group of node_classes within Node_Class table which build the pool of possible nodes within a mapping;

a Domain table defining which data element types can belong to a node or to a mapping and particularly defining the data structures stored within the model;

an Attribute table containing the actual operational data attached to the node or mapping;

a Display table defining a graphical representation of a specific view of the model, wherein multiple views on the model are achieved by filtering the display information;

a Shape table defining one or more graphical parameters needed to display node information, wherein the node information preferably includes the specification of position, size and/or shape and background specifications;

a Range table containing information controlling which color selected shapes should have when displaying query results;

a Query table containing information necessary to display the result of a SQL statement in a model, wherein the SQL statement is preferably stored as text and follows predetermined or predeterminable conventions to ensure that a query result contains exactly the number and types of columns necessary to be processed by the application properly;

a Widget table containing information necessary to control the layout and/or content of the nodes displayed; and/or a Tree table containing information necessary to build a tree page in conjunction with the Widget table.

Most preferably, the method further comprises a step of generating graphical user interface screens based on the structured, hierarchical model, which allow to input data, in particular one or more data attributes and/or operational data, in accordance with the structured, hierarchical model; and/or define or modify or customise the structured, hierarchical model.

According to a preferred embodiment of the invention, the graphical user interface screens are generated based on the information contained at least one of the following tables: the Display table, the Shape table, the Range table and the Query table.

Preferably, the method further comprises a step of generating a visual representation of the structured, hierarchical model into a database and/or of generating a plurality of scenarios or ongoing variations of the structured, hierarchical model.

Further preferably, the method further comprises a step of creating a visualisation of the structured, hierarchical model, executing user queries, merging the query results for display and/or controlling the dynamic scaling of visual output.

Most preferably, the method further comprises a step of reading one or more shapes attached to the model from the database, preferably via one or more links and/or one or more allowable shape attributes from the Attribute table, preferably via one or more links; and/or writing shape data and/or shape attribute data to an output file being preferably an output XML file.

According to the invention, there is further provided a computer program product, in particular on a carrier and/or stored on a computer-readable storage medium, comprising computer-readable instructions which, when loaded on a suitable computer, performs a method for capturing, aggregating and visualizing structural data of architectures of technical equipment such as IT architectures according to the invention or a preferred embodiment thereof.

According to the invention, there is further provided a structured, hierarchical model for enabling a capture, aggregation and/or visualisation of structural data of architectures of technical equipment such as IT architectures, in particular for a system according to the invention or a preferred embodiment thereof, comprising:

a model table containing one or more major attributes of the model, such as the name, type and version of the model;

a Node_Class table containing information regarding the types of nodes that the model contains; and a Node table containing the definition of each node within the model and the node's corresponding hierarchy information.

According to a further preferred embodiment of the invention, the model table, the Node_Class table and the Node table are linked to each other by means of respective strong links which preferably make use of a ROW-id of the respective table.

Preferably, the structured, hierarchical model further comprises at least one of the following tables:

a Nclass_Group table defining a group of node_classes within Node_Class table which build the pool of possible nodes within a mapping;

a Domain table defining which data element types can belong to a node or to a mapping and particularly defining the data structures stored within the model;

an Attribute table containing the actual operational data attached to the node or mapping;

a Display table defining a graphical representation of a specific view of the model, wherein multiple views on the model are achieved by filtering the display information;

a Shape table defining one or more graphical parameters needed to display node information, wherein the node information preferably includes the specification of position, size and/or shape and background specifications;

a Range table containing information controlling which color selected shapes should have when displaying query results;

a Query table containing information necessary to display the result of a SQL statement in a model, wherein the SQL statement is preferably stored as text and follows predetermined or predeterminable conventions to ensure that a query result contains exactly the number and types of columns necessary to be processed by the application properly;

a Widget table containing information necessary to control the layout and/or content of the nodes displayed; and a Tree table containing information necessary to build a tree page in conjunction with the Widget table.

According to the invention, there is further provided a data capture engine for a computerized information system for capturing, aggregating and/or visualizing structural data of architectures of technical equipment such as IT architectures, in particular for a system according to the invention or a preferred embodiment thereof, wherein the data capture engine captures and aggregates data based on a structured, hierarchical model, preferably according to the invention or a preferred embodiment thereof, the data capture engine comprises at least one database for storing the data according to the structured, hierarchical model.

According to the invention, there is further provided a display engine for a computerized information system for capturing, aggregating and/or visualizing structural data of architectures of technical equipment such as IT architectures, in particular for a system according to the invention or a preferred embodiment thereof, wherein the display engine generates a plurality of different displays of captured data based on a structured, hierarchical model, preferably according to according to the invention or a preferred embodiment thereof, the captured data being stored in at least one database according to the structured, hierarchical model.

Accordingly, there is provided an Application Management Visualisation Framework (AMVF) referring to a method, system, computer program product and single or set of support tools for delivering, within the context of architecture management, particularly information technology (IT) application architecture management, a consolidated, graphical representation of the complex interrelationships that exist between the single components of the architecture, particularly between the software components in a company's IT infrastructure, the (data) interfaces between these components, the business functions that these components implement, the organisational structures that are needed to design, build and/or operate these components and the related costs associated with the selection, purchase (or design and build if custom) and ongoing operation of these components, based on a standardized model representation of the technical and/or business functions that a company in this technical field or line of business typically performs. The Application Management Visualisation Framework comprises of a highly abstracted data model, a graphical user interface (GUI) generation engine, a visualisation engine and/or a scenario management engine. Operational details of the organisation's architecture, particularly the IT Landscape, can be preferably displayed as a graphical summary with drill down capability to view lower-level details. Through the creation of scenarios depicting the impact of various changes that could be made to any of the underlying implementation details, a more accurate analysis of the present architecture and of an impact of possible changes to it is possible so that the changing application landscape of the architecture can be better planned and managed.

The Application Management Visualisation Framework relates to computerized information systems in general and more particularly to the capture or input, aggregation and/or visualisation of data or information necessary to analyze, communicate and/or control the development of architectures, particularly of IT Architectures, over time.

According to a further aspect of the invention, there is provided a method and system for capturing, aggregating and/or visualizing structural data of a business and/or of architectures of technical equipment such as information technology (IT) architectures, which comprise the following steps:

analysing the business and/or architecture for determining a functional model of the business and/or architecture;

creating a mapping between applications and functions, wherein the data and the functionality are preferably separately captured, aggregated and/or stored;

and analysing and/or visualizing the data.

According to a preferred embodiment of this aspect, the analysing and/or visualizing the data is done by generating an application fingerprint, which gives an overview of the used functions per application and/or by means of an application report preferably giving information on: a short description of the application; a cluster mapping being preferably an application clustering including a cross-reference to cluster and sub-cluster; a function mapping; and/or a function description within an application context.

Preferably, the analysing and/or visualizing the data is done by generating a display of application or function redundancies for obtaining an overview of functions that are implemented in multiple applications.

Further preferably, the analysing and/or visualizing the data is done by generating a display of application costs (Budgets, software- or hardware-costs, investments for production, maintenance, development, user support, initiatives, etc.) structured by application or one or more clusters.

Still further preferably, the analysing and/or visualizing the data is done by generating a display of general application information on the type of applications (purchased or custom software), number of users, development or purchase costs etc.

Most preferably, the data are maintained by means of one or more maintenance masks for function mappings, which include mappings between applications and functions, descriptions of the functions within the application context, and/or documentation of Issues/questions and/or by means of one or more maintenance masks for application descriptions, comprising short descriptions for the respective applications.

Accordingly, there is provided an Application Management Visualisation Framework (AMVF) referring to a method, system, computer program product and single or set of support tools for delivering, within the context of architecture management, particularly information technology (IT) application architecture management, a consolidated, graphical representation of the complex interrelationships that exist between the single components of the architecture, particularly between the software components in a company's IT infrastructure, the (data) interfaces between these components, the business functions that these components implement, the organisational structures that are needed to design, build and/or operate these components and the related costs associated with the selection, purchase (or design and build if custom) and ongoing operation of these components, based on a standardized model representation of the technical and/or business functions that a company in this technical field or line of business typically performs. The Application Management Visualisation Framework comprises of a highly abstracted data model, a graphical user interface (GUI) generation engine, a visualisation engine and/or a scenario management engine. Operational details of the organisation's architecture, particularly the IT Landscape, can be preferably displayed as a graphical summary with drill down capability to view lower-level details. Through the creation of scenarios depicting the impact of various changes that could be made to any of the underlying implementation details, a more accurate analysis of the present architecture and of an impact of possible changes to it is possible so that the changing application landscape of the architecture can be better planned and managed.

The Application Management Visualisation Framework relates to computerized information systems in general and more particularly to the capture or input, aggregation and/or visualisation of data or information necessary to analyze, communicate and/or control the development of architectures, particularly of IT Architectures, over time.

According to a further aspect of the invention, there is provided a method and system for capturing, aggregating and/or visualizing structural data of a business and/or of architectures of technical equipment such as information technology (IT) architectures, which comprise the following steps:

analysing the business and/or architecture for determining a functional model of the business and/or architecture;

creating a mapping between applications and functions, wherein the data and the functionality are preferably separately captured, aggregated and/or stored;

and analysing and/or visualizing the data.

According to a preferred embodiment of this aspect, the analysing and/or visualizing the data is done by generating an application fingerprint, which gives an overview of the used functions per application and/or by means of an application report preferably giving information on: a short description of the application; a cluster mapping being preferably an application clustering including a cross-reference to cluster and sub-cluster; a function mapping; and/or a function description within an application context.

Preferably, the analysing and/or visualizing the data is done by generating a display of application or function redundancies for obtaining an overview of functions that are implemented in multiple applications.

Further preferably, the analysing and/or visualizing the data is done by generating a display of application costs (Budgets, software- or hardware-costs, investments for production, maintenance, development, user support, initiatives, etc.) structured by application or one or more clusters.

Still further preferably, the analysing and/or visualizing the data is done by generating a display of general application information on the type of applications (purchased or custom software), number of users, development or purchase costs etc.

Most preferably, the data are maintained by means of one or more maintenance masks for function mappings, which include mappings between applications and functions, descriptions of the functions within the application context, and/or documentation of Issues/questions and/or by means of one or more maintenance masks for application descriptions, comprising short descriptions for the respective applications.

The mechanisms and techniques described here may provide one or more of the following advantages. Tailoring of standardized models may meet a client's specific operational and strategic requirements. Structured data capture may be enforced such that the structured data capture is aligned with a client-customized model from the operational units within the organization. Data may be consolidated and filtered for analysis and appropriate communication. The development of multiple what-if and future scenarios within a client model may be supported. The mechanisms and/or techniques may be deployed within corporate intranet for easy data maintenance. A standard for comparing the current state of the architecture as well as any scenario with state-of-the-market and state-of-the-art structures may be provided. Resulting information may be delivered in an easily understandable and clearly communicable graphical representation.

Details of one or more implementations are set forth in the accompanying drawings and the description below. Other features and advantages may be apparent from the description and drawings, and from the claims.

DESCRIPTION OF DRAWINGS

FIGS. 15(A) to (L) are examples of Tables implemented in a preferred Data Model;

FIGS. 17(A) and (B) show exemplary displays of a Data Query/Reports Function of the preferred Application Management Visualization Framework (AMVF).

Like reference symbols in the various drawings indicate like elements.

DETAILED DESCRIPTION

Figure 1:
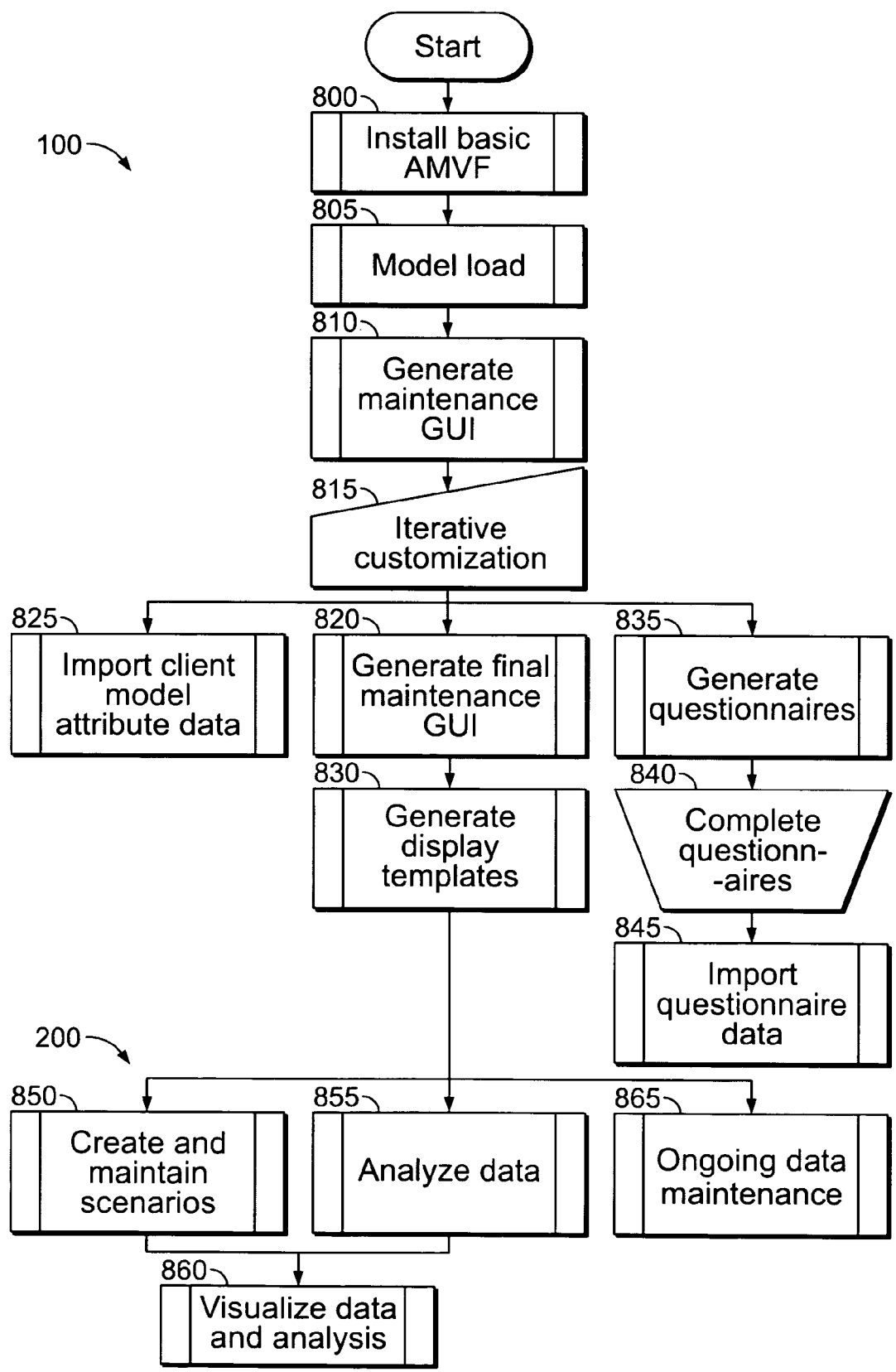
FIG. 1 depicts the overall workflow embodied within the Application Management Visualization Framework according to a preferred embodiment of the invention.

In the following description of preferred embodiments of the invention, the following terminology or understanding shall be applied:

Model: A model provides a structured, hierarchical view of a structure or architecture or business and builds the basic frame for analysis and/or visualization. A model can be a standardized model or a customer specific model. A standard model depicts the tasks and functions usually performed by a business and a normative clustering of these tasks and functions. A customer specific model is created when a standard model is adapted or modified (customized) to adhere to reflect the specific characteristics and qualities of an individual or intended structure or business.

Meta Model: The Meta Model is an abstract representation of the structure or business model, including a hierarchical mapping of the structure or business model entities and/or their corresponding graphical representation.

Model Data: Model Data are the customer specific, operational data that have been added to an existing model. This data can include, but is not limited to, application names, concrete cost values, organizational structures and/or application-to-application interfaces.

Meta Data: Meta Data are data that specify a concrete occurrence of the Meta Model. This data includes, but is not limited to, actual node-names, the node position in the model hierarchy, the shape-size and/or -position of the node's graphical representation and types of nodes that can exist.

Data Model: The Data Model is a logical image of a relational database that defines the relationship between the components of the Meta Model, the Meta Data and/or the Model data. The relational database implementing this model provides for the storage of all information required to represent the Meta Model and Model Data.

Framework: A Framework is an analysis paradigm comprising the Data Model, the implemented Meta Model, the Model Data and/or the Meta Data, along with the applications needed to analyze, visualize and/or maintain this information.

Table: A table is a collection of related records in a relational database in which relations (as an ordered set of fields, usually stored contiguously) between information items are explicitly specified as accessible attributes.

Strong Links: establish the dependencies between the data contained in 2 or more tables that are necessary to create the underlying structure of a model and the visualization of the model's hierarchical structure. Changing these links is possible, but involves a significant effort as these changes alter the basic hierarchical structure of the model.

Loose Links: establish the dependencies between the data contained in 2 or more tables that are necessary to create the relationship between the model structure and the detailed data and attributes that can be displayed at each level of the model hierarchy. These links are easily modified by the user and these changes do not materially change the model's basic hierarchical structure.

SQL Links: establish the dependencies between the data contained in 2 or more tables that are not implemented based on common fields within tables, but based on attributes specified in an SQL Query.

Scenario: A scenario is a representation of an alternative implementation, both within the data model and in the visualization of the IT architecture, used to support the what-if analysis of the impact of change on the IT architecture over time. Scenarios can represent a point in time (what if I do "A" vs. "B" vs. "C") or a timeline (what if I do "A" then "B" vs. "A" then "C" vs. "B" then "C"). Within this context, the initial customized, client specific model and initial data can be considered the initial scenario from which all changes and alternatives are based.

In the following, a detailed description of Application Management Visualization Framework (AMVF) according to a preferred embodiment of the invention is given with reference to FIG. 1.

In FIG. 1, the overall workflow for the Application Management Visualization Framework is depicted. In practice, the Application Management Visualization Framework preferably comprises two phases: an Initialization and/or Data Capture phase 100 and an Analysis, Dynamic Visualization and/or Maintenance phase 200, whereby the transition from the Initialization and/or Data Capture phase 100 to the Analysis, Dynamic Visualization and/or Maintenance phase 200 is not clearly defined. This workflow is supported by major framework components as will be described with reference to FIG. 2, which depicts the relationship between the major components of the Application Management Visualization Framework, client specific input requirements, and the resulting client-specific custom components. The main components of the Application Management Visualization Framework are:

1. The Database 300/500 comprising of an implementation of a structured, hierarchical model 10 comprising a meta model
2. The Visualization Engine 510
3. The Graphical User Interface (GUI) Generation Engine 520
4. The Scenario Engine 530
5. A plurality of Questionnaire Templates 430.

Once the Application Management Visualization Framework is to be used, the main components of the basic Framework are or need to be installed 800. This initial installation 800 can occur at the client site or off-site. In order to provide for ongoing use of the Application Management Visualization Framework, however, it is advantageous at some point be installed locally at the client. In step 805, a standardized generic model is selected that closely conforms to the area of analysis of the architecture desired by the client or a default model is set and loaded into a basic database 500, which represents a physical implementation of the Data Model. The model selected or set should preferably include all major components, functions and/or features that the architecture should fulfill (e.g. the client requires), organized in a hierarchical manner.

Then, in step 810, the Graphical User Interface (GUI) Generation Engine 520 is used to create GUI screens 440 as preferred questionnaire templates 430 which are used to maintain (or update) and/or alter this initial model, its components and/or structure. In Step 815, the Scenario Engine 530 makes use of these screens 440 and/or of manual input to customize the model parameters (i.e. adapt the model to the actual or desired architecture) until it is aligned with the specific clients requirements. Using the GUI screens generated by the Graphical User Interface (GUI) Generation Engine 520, the model structure, supported relationships between model entities, attributes and/or graphical representations are specified. This customization process includes the creation of one or more additional models 400 needed to portray the architecture, particularly an IT Architecture, in its entirety. These models 400 include, but are not limited to, the companies (IT) organizational structure and cost structure, and preferably are linked into the Meta Model at as low a hierarchical level as possible. This provides the best combination of detail analytical and summary rollup capability.

Figure 2:
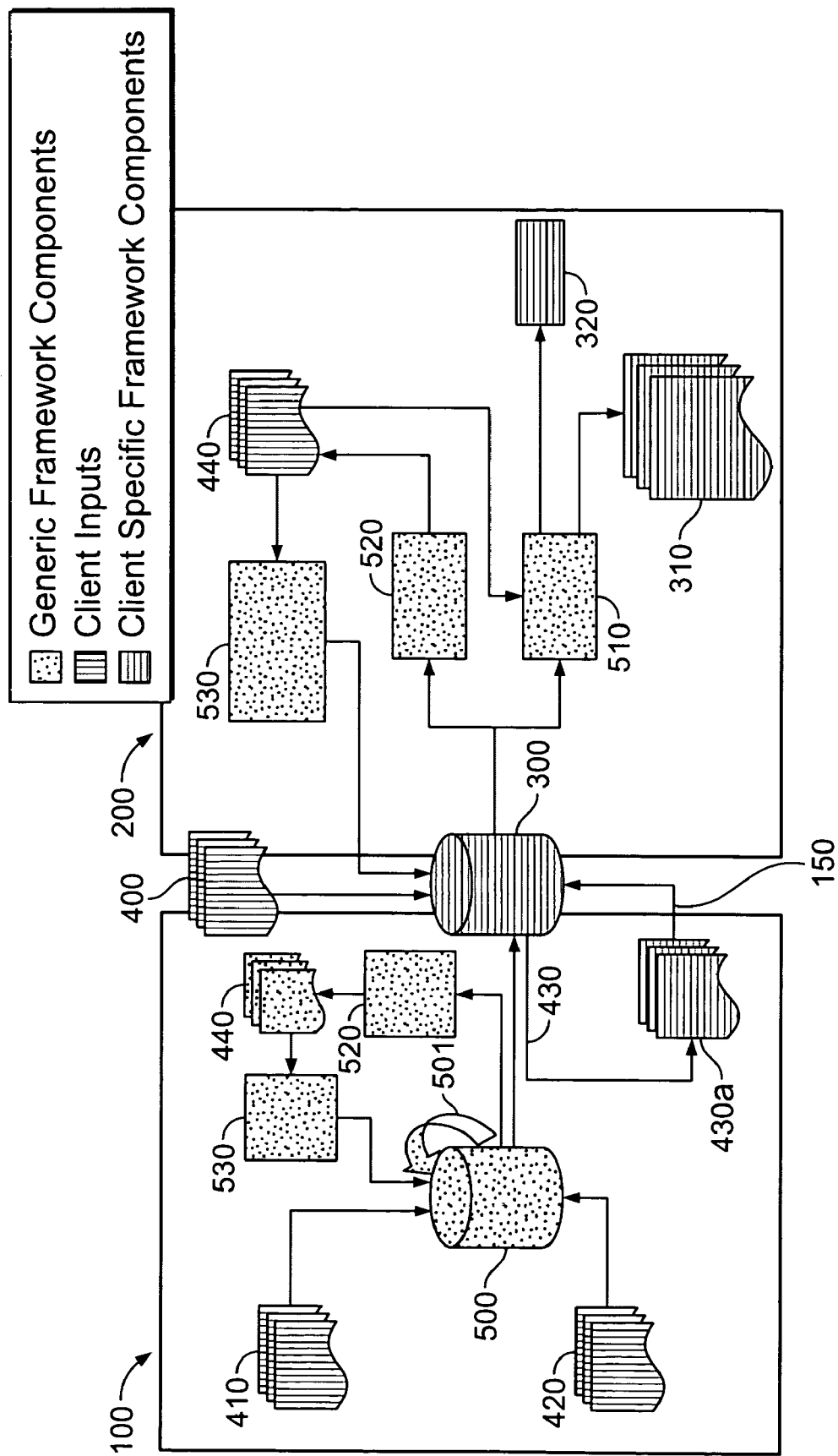
FIG. 2 shows the major components of the Application Management Visualization Framework, the major client specific inputs and components generated to adhere to client specifications of the preferred embodiment.

The described iterative process 501 of inputting the model structure, supported relationships between model entities, attributes and/or graphical representations effectively transforms the initial Application Management Visualization Framework database (reference numeral 500 in FIG. 2) into the client specific database (reference numeral 300 in FIG. 2).

Once the one or more models have been customized, the client specific data attributes and operational data for each model are loaded 825 into the database 500/300 and the final maintenance screens 440 are created 820 using the GUI Generation Engine 520. Based on the data relationships supported by the newly created custom model in the database 300, tailored questionnaires (step 835) are generated based on the Application Management Visualization Framework Questionnaire templates 430 and (preferably automatically) distributed to the appropriate subject matter experts within the client's organization for completion 840 e.g. via email. In the case of paper-based and/or email-based questionnaires, the feedback gathered in this fashion is imported 845 into the database 300. Questionnaires may, however, be completed online or off-line and imported accordingly. In the latter cases, the information can be entered directly into the database. It is advantageous to complete this information gathering exercise in a relatively short timeframe (e.g. less than 2 months) to insure that the initialized data model accurately reflects the true "state of affairs".

Once this detailed information collection is completed, the initialization phase 100 is effectively completed. These initialization steps 800-845 may, however, be performed repeatedly (singularly, in part or totally) as needed, in order to build additional model(s) and/or visualizations into the client customized version of the Application Management Visualization Framework for more closely reflecting the architecture under analysis. The process of generating 830, 835 and completing questionnaires 840 can be repeated, in total or for specific areas, if warranted, but typically, the information contained in the active database 300 is maintained or updated online. Although depicted as a separate phase, the ongoing activities shown in the Analysis, Dynamic Visualization and/or Maintenance phase 200 can actually be started at any time after step 810 is completed.

Following the initial setup, the Analysis, Dynamic Visualization and Maintenance Phase 200 comprises at least one of the following additional activities:

1. a Scenario Building 850,
2. a Data Analysis 855,
3. a Visualization 860, and/or
4. a Data Maintenance 865.

Through the building of scenarios 850 by means of a Scenario Engine 530 to be described later, differences in implementation and/or changes in architecture (due e.g. to changes in business strategy) can be simulated, visualized and/or evaluated. Users can create and/or maintain scenarios via the Scenario Engine 530. The Scenario Engine 530 preferably allows the user to create and/or link multiple versions of a model, or even multiple models to create "snapshots" of potential future states.

The combination of strong links that define the model structure and loose links that define the relationships between nodes and/or node attributes means that allow users to easily develop a "timeline" of these snapshots or a sequence of displays reflecting single changes in the architecture by changing the loose links. This significantly enhances the what-if capabilities of the Application Management Visualization Framework. For a more detailed description of strong and loose link types, see the example described with reference to the data model overview.

The scenario engine 530 ensures that various scenario constructs remain independent of each other. Through the development of multiple scenarios, different pathways to common goals (e.g. a desired functionality of the architecture) can also be evaluated. In this fashion, optimal approaches to achieving specific goals can be constructed based on the goals being pursued (e.g.: cost vs. time optimization vs. risk minimization). Within the various scenarios that are developed, one is set as active. This active scenario represents the actual status or baseline status (baseline status may in fact represent a future point in time) of an architecture under analysis, e.g. a client's IT Architecture, for use in comparison to other, non-active scenarios.

In the data analysis function 855, the user retrieves and/or filters current operational data and scenario-specific data consistent with user inputs. This can be done by directly querying the database 300 via structured query language (SQL) and/or by using the Visualization Engine 510 to guide and assist the analysis. In the case of a direct query, the results are not displayed graphically, but may be exported into a wide range of external tools for further enrichment with data not contained within the database 300 and/or additional analysis. Otherwise, the results of the analysis are passed to the Visualization engine 510 for rendering and display.

The Visualize Data and Analysis task 860 also uses the Visualization Engine 510 to support both functions create/maintain scenarios 850 and analyze data 855 by consolidating the data into visual representations and/or rendering their display. These visual structures of the display are data independent in that the possible shapes and/or the relationship between shapes used to depict the hierarchical levels of the model 10 were specified during the iterative customization 815. The operational data merely provide the information (color, shape, position, etc.) needed to properly specify or choose the display attributes for the different shapes.

Within the Application Management Visualization Framework's graphical visualization and analysis phase 200, a standardized, hierarchical structural model 10 of the structure(s) or architecture(s) or business forms a basis for both the analysis and display functionality. The innovative aspect of the solution lies in the generic storage of any kind of architecture or business model and the storage and analysis of relationship data between models. Whereas models and their components are strongly linked together by means of one or more strong links ensuring that the model(s), their nodes and their different graphical representation(s) form a unity, the relationships between models are loosely coupled by means of one or more loose links. Loose links allow that the end points of the respective relationship(s) may be moved within a model or even be removed without forcing the relationship to be removed as well. These "broken links" (loose links without an existing end-point) stay visible and can be analyzed since they contain valuable (historic) information on the architecture or business.

For example, a generic automobile would be one such model. It has a defined, shape, is made up of specific components (wheels, motor, frame, axles, differential, etc.), each having an associated characteristics (costs, materials used, supplier, lead time to change, etc.) and each added to the car assembly in a specific order (workflow) by different workers and/or machines (organization). The generic representation of this model car can be represented via strong links between the 3 core model tables and the graphical representation tables (compare FIG. 4). By applying this generic model to a specific manufacturer, a hierarchy of vehicle makes and associated model years, included parts and assemblies, etc. can be made. The individual vehicle types correspond to nodes in the generic model. An additional model would be the hierarchy of automobile parts suppliers where there are relationships between the different nodes of the supplier model (the supplier itself) and the nodes of the automobile model (the supplier's respective part). Data associated with these relationships would be for example the part's price, shipping conditions, supplier quality or other data that would be of interest from a structural or business context and needs to be visualized. If, for example, one supplier goes out of business and is removed from the supplier model, the "broken links" of the parts-supplier relationships can be detected and have to be re-mapped to existing suppliers or new suppliers which have been added to the supplier model. Also, analytical queries can be run on the relationships to find critical dependencies where for example too many important parts are just delivered by a single supplier group.

The same or a similar type of model may be established for the types of working, machines and technical facilities necessary for producing and/or assembling an automotive vehicle. Accordingly, such model would allow to capture, aggregate and/or visualize data of a production facility of automotive vehicles e.g. in view of optimizing the workflow in a production line, removing or adding single manufacturing steps in a production, replacing machines having specified working properties by other machines having different working properties, etc.

Having the possibility to adapt models is complemented by the possibility to have several models of the same or similar type in parallel and to analyze them within different scenarios. E.g. developing a new vehicle doesn't change the basic model structure and can be accomplished by editing or adding data points in the meta model connected with each other via loose links (See FIG. 5—Mapping Relationship Tables and Data linked to Relationship tables). Even a change from the manufacture of passenger cars to passenger vans could be accomplished in this fashion, as the basic model structure remains the same. However, some of the nodes may get removed (e.g. a passenger van does not have a trunk), others may be added (e.g. a van may have three rows of seats). The scenarios created would reflect changes in the detail attributes of the basic model (e.g. by moving the production of engines to east Europe, the production price is reduced by <15%, the engine nodes are in the models of both scenarios, however, the product price attribute may be set to be different)

Sometimes, it is necessary to provide planning support for more radical changes in the underlying structure or architecture or business. E.g. when changing from the manufacture of cars to the manufacture of airplanes or boats, these changes in structure or architecture or business would be accompanied by changes of the basic model structure particularly to account for the differing graphical representations needed to visualize the structure or architecture or business. This model change would require the altering of data connected via one or more strong links. At a minimum, the Model-Display relationships would change. Once the basic model is established, however, it is not often changed since the underlying structure or architecture or business that the model represents is usually relatively stable. However, the relationships between the nodes of the model with other models and especially the associated data will change more often (e.g. prices for parts are changed every year, the relationship between auto parts and their supplier companies are also volatile, etc.) And the use of loose links to create these relationships improves end user usability and overall AMVF flexibility.

To support this kind of transitional planning, the starting and ending models would be loaded into the database as alternative scenarios. The necessary interim model structure(s) accompanying this transition would also be defined as scenarios. The complexity and magnitude of such a change is significantly greater than transitions within the confines of a model, but the AMVF supports the planning and analysis in the same easy to use, easily communicated fashion.

In the following, a detailed description of a preferred embodiment of underlying data structures is given.

The high flexibility of the data model required to be capable of managing different kind of models is achieved through a combination of strongly and loosely linked tables within the data model.

Strong links make use of the table Row-IDs (see e.g. FIGS. 15(A)-(G) where "rid" stands for Row-ID) and ensure that for every record there has to be a foreign key relationship to the primary key of a record in another table.

Loose links make use of a row's Unique-ID (see e.g. FIGS. 15 (B)-(D)). Loose links also establish a foreign key relationship to another table, however, the link will be done via the Model Type in case of models (the correct model will be selected by the "active-flag") and/or via the unique-key identifier (e.g. in case of nodes). This allows several different versions of the same model type to exist in parallel. In this way, updates to the models can be supported to reflect organizational changes without loosing the remaining data relationships.

This combination of link types (strong links and loose links) optimizes the ease of extending the data model to incorporate new model types, new attributes, data types, etc.

The data model, while proprietary, is preferably made accessible to the client or user implementing the Application Management Visualization Framework. This open data model allows SQL read and update access to experienced power-users optimizing system usability. Using this feature, however, may require that additional access control and security rights be implemented directly in the database.

Additional queries can be preferably developed and stored enabling alternative analysis scenarios.

Conceptually, the Data Model (as a preferred structured, hierarchical model) is split between a metadata level (which describes the model's structure) and an operational data level (i.e. model data which provide the detailed attributes and/or implementation and scenario details).

i. The metadata level describes the model itself, the allowable relationship between nodes of the same or different model, the graphical representation of nodes and/or the allowable attribute types for nodes.

ii. Meta data model is also split between structural data and visualization data. Structural metadata controls what specific operational data is permissible within the database (model) and/or how this data is interrelated. Visualization metadata defines how the underlying operational data can be filtered and/or displayed.

iii. The operational data are or represent essentially the current and what-if and/or scenario permutations of the attributes. This data provides the content and/or visualization clues to be displayed by the Generation Engine 520.

iv. Due to the separation of the operational data from the model and model-specific display characteristics, the GUI Generation Engine 520, the Scenario Engine 530 and the Visualization Engine 510 function independently of the operational data. Operational data filtering provides the display attributes (for example different coloring depending on business relevant data e.g. higher cost, number of occurrences, cost, etc.) but the display structure is defined as a characteristic of the model by means of corresponding tables (such as a Display table 31, a Shape table 32 to be described later).

Particularly, the GUI Generation Engine 520 accesses the data contained the Model table 11, the Node_class table 12, the Node table 13, the Display table 31, the Shape table 32 and/or the Attribute table 61 for a specified model 10 by iteratively querying links 11*a*, 11*b*, 11*c*, 12*a*, 13*a*, 13*b* and/or 31*a* for each level of the specified model's hierarchy. For each level, the basic display structures and shapes obtained by the query are written to an xml file for rendering. An exemplary output of this generation can be seen in FIG. 12, which shows the general display structure, but no operational data details.

The Scenario Engine 530 advantageously serves two purposes. During the initial load of a model hierarchy, the Scenario Engine 530 is responsible for establishing the table entries and links used by the GUI Generation described above. During the creation of scenarios, the Scenario Engine 530 provides the mechanism for writing detailed characteristics and occurrences of nodes into the Attribute table 61 and establishing the links between these details (links 12*a*, 13*a*, 13*b*, 13*c*, 62*a*). The Scenario Engine 530 also writes the related display information into the Mapping_class table 42, the Mapping table and/or the lov_group table 63 and establishes the links between them (links 14*a*, 14*b*, 41*a*, 42*b*, 63*a*, 63*b*).

The Visualization Engine 510 uses the iterative queries of the GUI Generation Engine 520, but for each node access the Attribute table 61 uses link 13*a* to obtain the characteristics (number of occurrences, label text, etc) for display. An exemplary output of the Visualization Engine 510 can be seen in FIGS. 13 and 14. Since the number and alignment of lowest level hierarchy nodes differs between the FIGS. 13 and 14, a dynamic modification of the space allotted to both the shape depicting the lowest and successively higher hierarchy levels needs to change. The Visualization Engine 510 handles this dynamic visualization by performing a bottom up recalculation of the display area for individual shapes based on the number of occurrences of the shape (link 13*b*, 31*a*) and resizes the individual shapes as needed. Once the entire display is generated, the Visualization Engine 510 applies the client specified scaling factor to the display to obtain the desired display size.

In the following, common features preferably of all tables within the data model are described.

i. Artificial, Generated Primary Key

All tables have a primary key preferably comprising a CHAR(20) field. This key is automatically generated and ensures uniqueness throughout the whole database (example: "DK-00000000-00002FAE"). This key will also be used when creating references in one-to-one or one-to-many relationships (see e.g. FIGS. 15(A)-(G)).

ii. Scenario Columns

Every record preferably has 3 scenario-related columns ("scenario_id", "valid_from", "valid_to") that will be used to identify the scenario the record belongs to. Scenarios will be handled via Views.

iii. Simple Audit Columns

Every table preferably contains columns to give audit information ("created", "created_by", "lastupdt", "lastupdt_by") which will be preferably automatically filled and give some level of Auditing. Additionally, a full-level Auditing mechanism could be implemented.

In the following a detailed description of a preferred Data Model is given with reference to FIG. 3.

Figure 3:
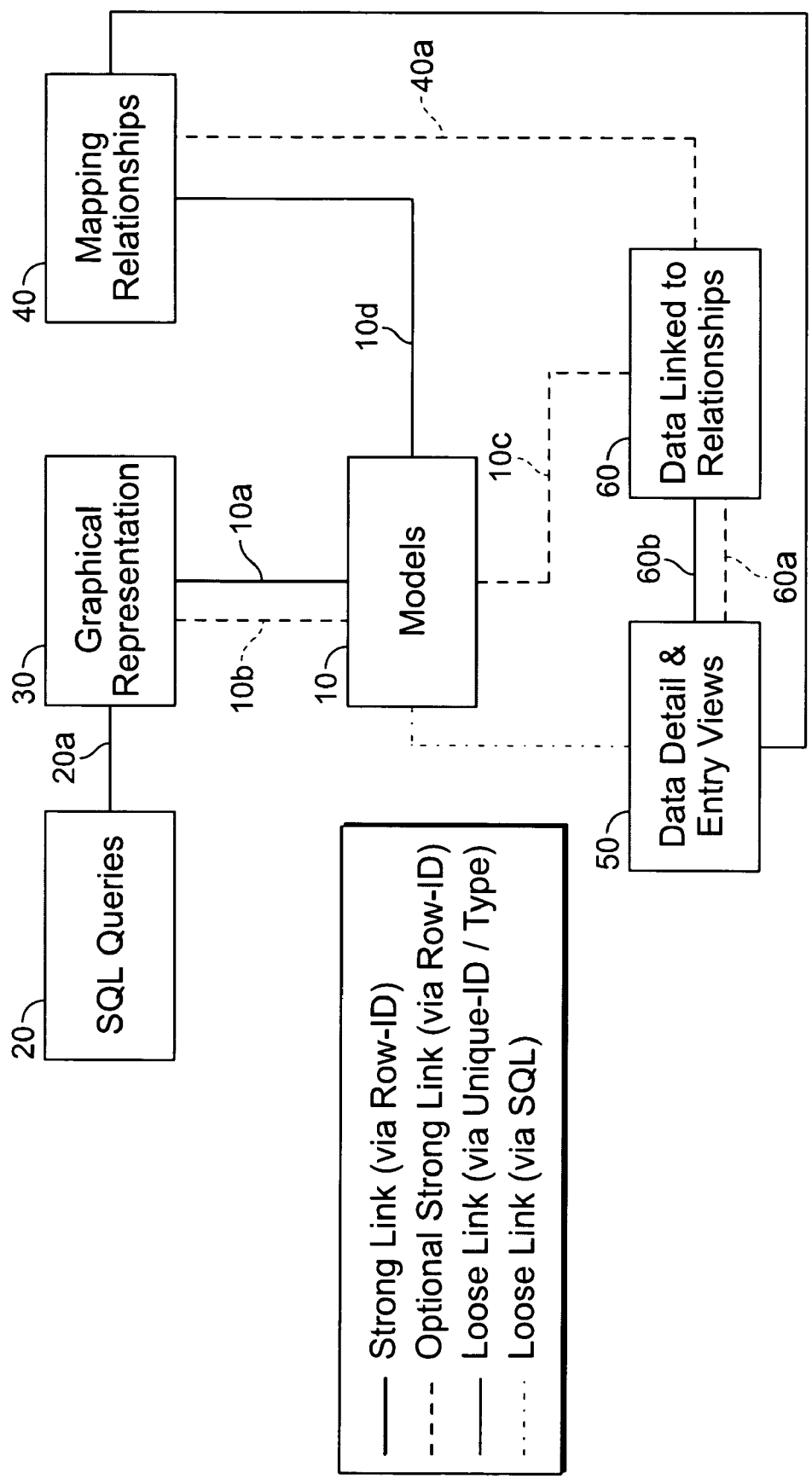
FIG. 3 shows the main Data Model entities and relationships of a structured, hierarchical model according to a preferred embodiment of the invention.

The Data Model to be stored in the database 500/300 is preferably implemented according to high-level table structure depicted in FIG. 3. The data model preferably comprises one or more, preferably a set of Models tables 10 that contain the hierarchical representation of the model being evaluated, the allowable end points (Nodes) of this representation and the physical structure of the model (Domains), which is contained in the Data Linked to Relationships Tables 60. The related Graphical Representation Tables information contains valid visual constructs (such as Rectangle, Polygons, Circles, Ellipses, Text, etc.) for the model. The Mapping Relationship Tables 40 contain valid relationships between models and their components (Nodes and/or Domains). The SQL Queries tables 20 contain the information necessary to execute and/or display queries and/or to perform data analysis. These tables control the data dependant display characteristics. The Data Detail and Entry Views Tables 50 provide filter functions to control data entry and/or maintenance. In addition to the model structure data, the Data Linked to Relationships Tables 60 contain the client specific, detailed attributes associated with the models.

Strong links within the Data Model create logical units comprising, preferably consisting of, a specific model, the model attributes and/or attribute data. These links are preferably specified during the initialization phase 100 and provide the basic analysis and/or visualization framework. Once established, the strong links are designed to have long-term persistence. Altering strong links results in the creation of a new model.

Loose links create relationships that are designed to be user modifiable. Changes in the loose links represent changes or proposed changes to the architecture over time. As loose links are broken and/or re-established, the process creates "broken links" which provide a representation of prior model details (historical perspective). The strong link 10*a* between the Models 10 and the Graphical Representation 30 is preferably created during import of xml via the Scenario Engine 530. The strong link 10*a* determines the graphical implementation of a specific model. The optional strong link 10*b* between Models 10 and the Graphical Representation 30 can be used to attach or include one or more different graphical representations of the same model—with the ability to filter and/or aggregate information for different level of analysis e.g. dependent upon the respective decision makers. This strong link (or links) between the Models tables 11-13 and the Graphical Representation tables 31, 32 determines the actual shape used to depict a model node. This link specifies a graphical representation that defines how a model in its entirety will be displayed. The loose link 10*d* between the Model table(s) 10 and the Mapping Relationships table(s) 40 provides the user with the flexibility to easily alter the logical relationship between components within a model, add new model functions, etc. The loose link 10*d* determines which node pairs can be mapped together. The optional strong link 10*c* between the Model table(s) 10 and the Data Linked to Relationships Table(s) 60 controls or defines the assignment of operational data detail to the nodes of the model. As described, a loose link allows users to alter data content without affecting the overall model. The loose link 20*a* between the SQL Queries table 20 and Graphical Representation table(s) 30 specifies the type of model to use in displaying query results. The optional strong link 60*b* between the Data Detail and Entry Views table(s) 50 and the Data Linked to Relationships table(s) 60 provides display details for model nodes. The strong link 60*a* the Data Detail and Entry Views table(s) 50 and the Data Linked to Relationships table(s) 60 can be used by SQL Queries to link detailed display attributes with display structures, providing access to the characteristics that can be displayed for each node.

Figure 4:
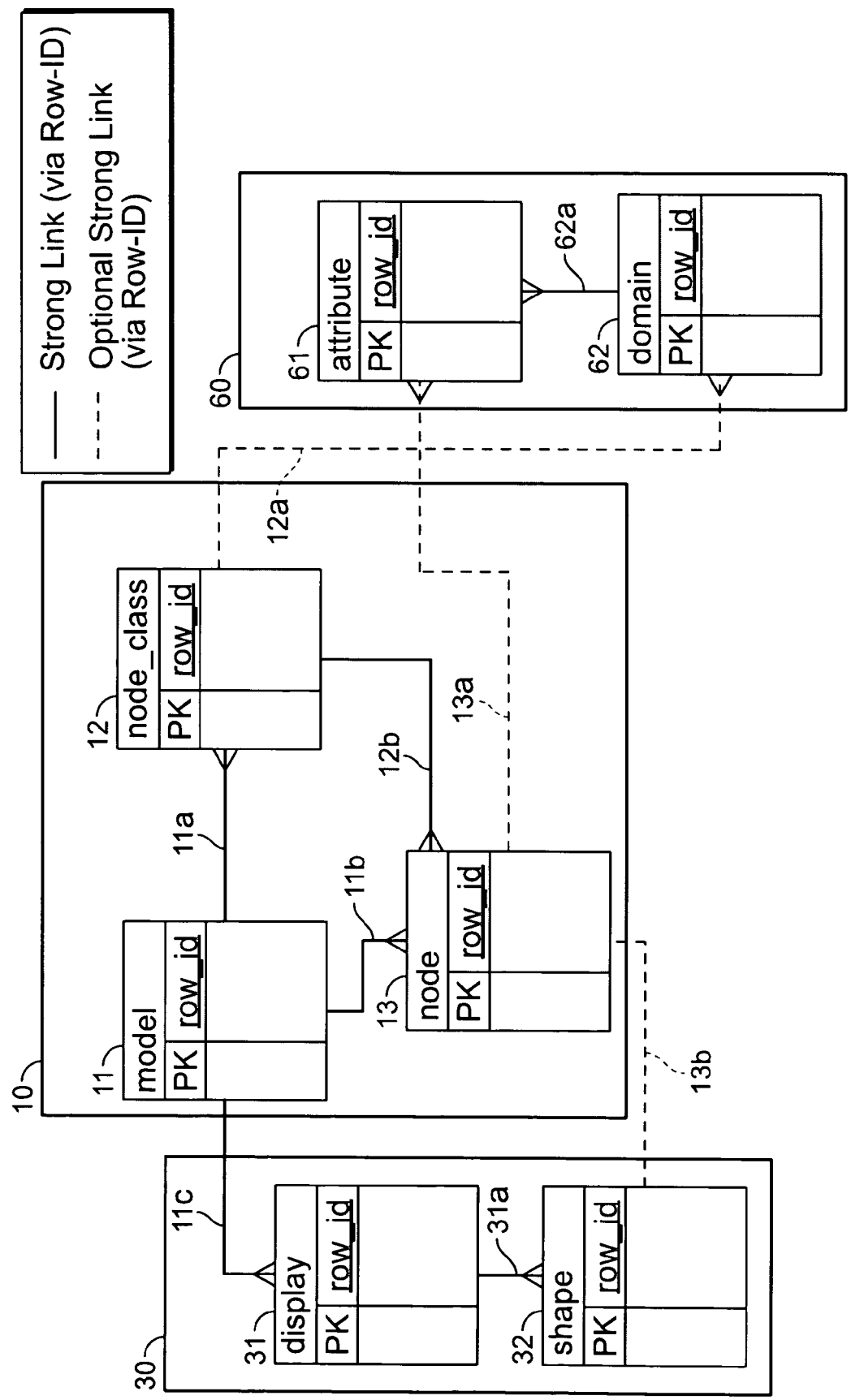
FIG. 4 shows a preferred detailed table structure for the handling of models.

In the following, preferred table structure details for the handling of Models are described with reference to FIG. 4.

Preferably, the Models table 10 comprises a Model table 11 containing the major attributes of the model, such as the name, type and version of the model. An optional comment field may describe the model (see FIG. 15(A)).

Moreover, the Models table 10 comprises a Node_Class table 12 containing information regarding the types of nodes that the model contains (see FIG. 15(B)). The Node_Class table 12 preferably contains an entry for each type of node within the model and serves as an Anchor point for the corresponding domain entries. A Node Class Name preferably identifies the purpose of the node but is mainly for informational purposes (no semantic meaning). Core Attributes of the Node_Class table 12 include the row_id of the model and a unique ID identifying the Node Class.

The Models table 10 further comprises a Node table 13 containing the definition of each node within the model and the node's corresponding hierarchy information (see FIG. 15(C)). The Node table 13 defines each node of the model with the unique_ID and the hierarchy information, wherein each Node has a link to a node_class entry to determine its data elements. The Node table 13 preferably comprises the following Attributes: A "model_rid" containing the row_id of the model the node belongs to, a "node_class" specifying the type of the node, a "unique_id" identifying the node (has to be unique within the model), a "hierarchy_id" specifying the position of the node in the tree and the unique_id of the parent node and/or user information like node user-type, display name, which is defined upon model creation and can be used for user specific purposes.

The Data Linked to Relationships table(s) 60 preferably comprises a Domain table 62 which defines which data element types can belong to a node or to a mapping and defines the data structures stored within the model (see FIG. 15(G)). The Domain table 62 defines the type of data elements that belongs to either a node or a mapping. This is one of the main entities to define the data structures stored in the models. The Domain table 62 preferably comprises the following Attributes: An "attribute_name" attribute which is the unique identifier for the domain entry, an "data_type" attribute which specifies which type of data is stored, wherein data types can be "string", "double", "lov" (List of predefined Values), "set", "dictionary" (key-value pairs), "object" (a reference to an object), an "attached_to" attribute which specifies whether the domain belongs to a node or an object-node-mapping, wherein depending on this value, the reference contains the Row-ID of a node_class or a mapping_class, and/or other attributes like Display name, several flags and/or the "edit_field" define the handling of the data.

Preferably, the Data Linked to Relationships table(s) 60 further comprises an Attribute table 61 containing the actual operational data attached to the node or mapping (see FIG. 15(F)). The Attribute table 61 preferably comprises the following attributes: a "domain" attribute defining the data type for this value, a reference being either the row-id of the node or the mapping (depending whether the domain is attached to a node or to the mapping), a "complex-key" attribute being used for "array" and "dictionary" data types and/or a "Value" attribute containing a textual value, in case of numeric values the "value_num" field contains a "decimal" representation to be used in aggregate functions (e.g. Sum).

The Graphical Representation table 30 preferably comprises a Display table 31 defining a graphical representation of a specific view of the model. In other words, the Display table 31 controls the different graphical representations of a model. Multiple views on a model are achieved by filtering the display information (see FIG. 15(D)). One of the displays defined within the Display table 31 preferably should be defined as the default display of the model. The Display table 31 preferably comprises the following attributes: a "unique_id" of the display, a flag specifying whether the display is the default display and/or an optional description of the respective display.

Furthermore, the Graphical Representation table 30 preferably comprises a Shape table 32 defining the graphical parameters needed to display node information. This information preferably includes the specification of position, size and shape and background specifications (see FIG. 15(E)). In other words, the Shape table 32 preferably defines the graphical representation of nodes as well as the graphical representation of the background shapes, wherein supported types of graphical representation preferably are "Rectangle", "Text" and "Freeform" (Multi-Point Polygon). The Shape table 32 preferably comprises the following attributes: a "model_id" the shape belongs to and the row-id of the node the shape does represent, a flag specifying whether the shape is a background shape, a position, size and/or color of the shape for the rendering, and/or an optional label (used for "Text" and Background Shapes).

As described the Application Management Visualization Framework according to the preferred embodiment is based on the one or more Models, and the model information contained within these tables is strongly linked together to build a consistent logical perspective of what the model depicts. The strong link 11*a* between the Model 11 and Node_Class tables 12, the strong link 12*b* between the Node table 13 and the Node_Class table 12 and/or the strong link 11*b* between the Model table 11 and the Node table 13 establish the basic model structure. Together, the strong links 11*a*, 11*b* and 12*b* across these three tables 11-13 define the overall structure of the model. An optional strong link 12*a* between the Node_Class table 12 and the Domain tables 62 enhances this basic structure with the types of data that can be attached to a node or matching. A strong link 62*a* between the Domain table 62 and the Attribute table 61 specifies what type of the data the attribute is. An optional strong link 13*a* between the Node table 13 and the Attribute table 61 establishes the unique node or mapping to which the attribute data belong. In order to support the visualization of different views on model, the strong link 11*c* between the Display table 31 and the Model table 11 align or coordinate the different graphical representations with the model. The strong link 11*c* preferably also provides a mechanism for filtering the model display to provide different views on the model data.

Figure 5:
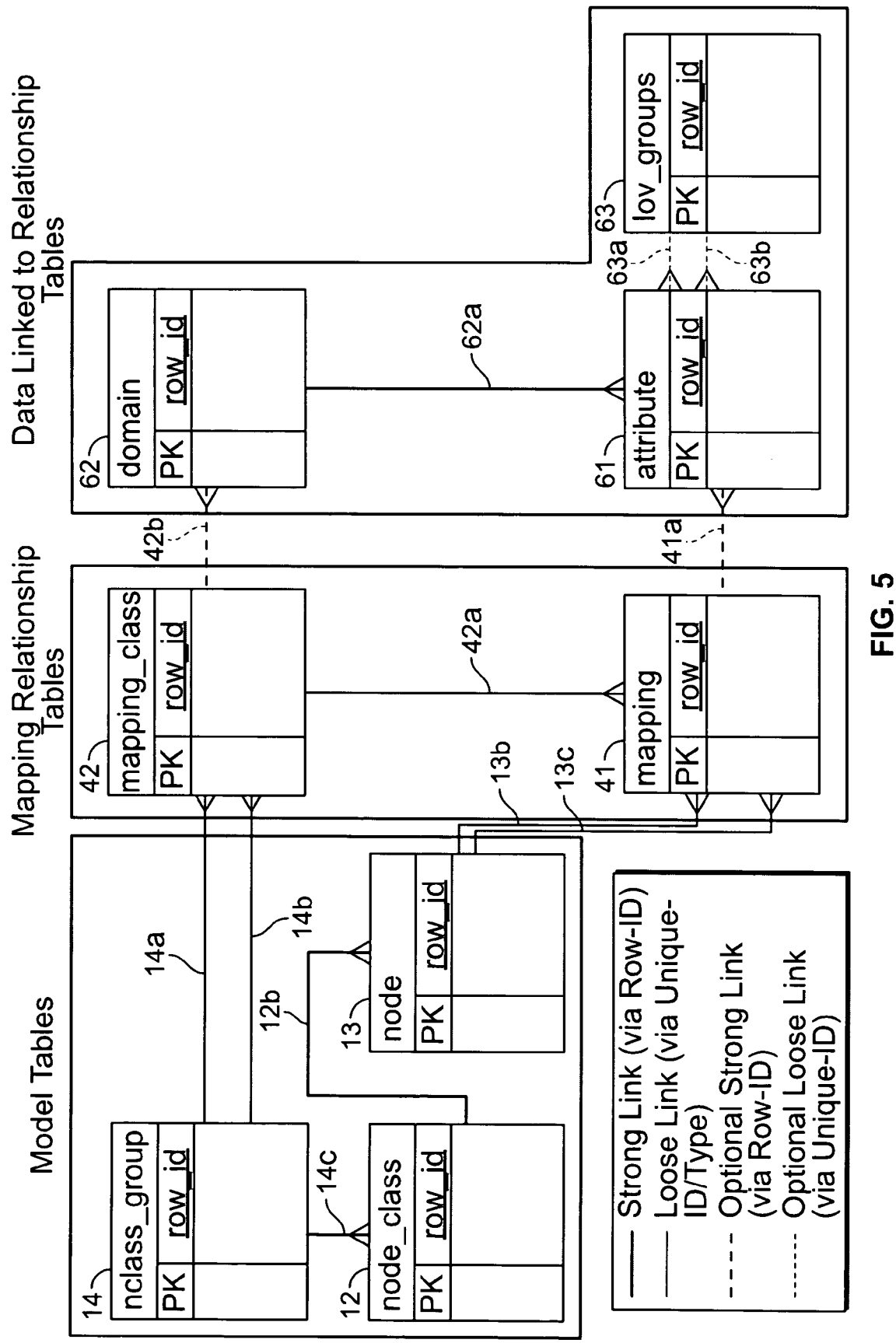
FIG. 5 shows a preferred detailed table structure for the handling of mappings.

Preferred Table Structure Details for the handling of Mappings are described with reference to FIG. 5.

Generally speaking, mappings refer to the possible relationships that exist between nodes of the model. Since not all nodes of a model can be mapped to each other, a mechanism is needed to control the establishing of these relationships. In addition to the Node table 13, the Node_Class table 12, the Domain table 62 and the Attribute table 61, for establishing the node-to-node relationships the Model table 10 preferably comprises the following four additional tables:

A Nclass_Group table 14 defines a group of node_classes that build the pool of possible nodes within a mapping. This entity allows for a hierarchy of node_classes each of which can be a member of a mapping. For example, there are different node_classes in the Application model (Applications, external Applications, and Infrastructure Applications). For a cost related mapping, external Applications are not relevant and should not be able to be part of these mappings. External applications are relevant for interface related mappings while the Infrastructure applications are not.

A mapping_class table 42 defines the different mapping types of mappings between the nodes of certain node_classes and the domains for each mapping type. The Mapping_class table entries preferably specify what 2 node_classes participate in a mapping (see FIG. 15(H)). The mapping_class table 42 comprises the unique_id and the type of the model of the two node_classes as preferred attributes.

A Mapping table 41 contains the possible many-to-many relationship entries between model nodes, and also the relationships between different models (see FIG. 15(I)). The Mapping table 41 preferably contains an n:m relationship (many-to-many relationship) entries between model nodes, also of different models. The mapping to the nodes preferably is done via the node unique ID and the model Type, not via the row_id of the node. This allows the handling of model updates (new nodes, change of node positions, node splitting, etc.). A "speedlink" column is preferably used to allow faster (single-column) access to the mapping. The Mapping table 41 comprises the unique_id and the Type of the model of the two nodes as preferred attributes.

A Lov_groups table 63 contains predefined code-decode pairs that specify the fixed optional values for data elements (see FIG. 15(J)). The code-decode pairs preferably are in ordered groups for fixed value sets. This data is available for user selection during data entry to ensure that only valid attribute data get entered into the database. In other words, the Lov_groups table 63 contains predefined code-decode pairs that can be used as fixed set values in data elements. LOV groups preferably are to be entered using Drop-Down Listboxes. Moreover, LOV's will also be used in dictionary data types as keys for the named key-value pairs. The Lov_groups table 63 preferably comprises the following attributes: an unique identifier of the LOV group and the order of the LOV entry within the group (will be used to order the entries in the List Box), a code and decode (code will be stored in the attribute table, the decode will be presented to the user) and/or an optional comment.

An optional strong link 41*a* between the Mapping table 41 and the Attribute table 61 specifies the attributes of a mapping in an analog fashion to the specification of attributes for nodes. An optional strong link 42*b* between the Mapping_ class table 42 and the Domain table 62 specifies the domains contained within a mapping class. These domains can be either node specific or mapping specific.

Since the relationship between nodes can change under different scenarios, the Node table 13 and the Mapping table 41 are joined or linked via one or more loose links 13*b*, 13*c* to enhance usability and flexibility. There are preferably two loose links 13*b*, 13*c* between Mapping table 41 and the Node Table 13. These loose links 13*b*, 13*c* define the relationship between two nodes, and support the building of many-to-many (n:m) relationships between nodes. Analogous to these two loose links 13*b*, 13*c* are the loose links 14*a* and 14*b* between the Nclass_group table 14 and the Mapping_class table 42. These loose links 14*a* and 14*b* define which node_ class pairs can be in a mapping, and support the building of many-to-many relationships between node_classes. A strong link 14*c* between the Node_class table 12 and the Nclass_ group table 14 defines which node_class types define a group. A loose link 42*a* between the Mapping_class table 42 and the Mapping table 41 defines the different mapping types available, and an optional strong link 42*b* between the Mapping_ class table 42 and the Domain table 62 provides the domain for each mapping. Two optional loose links 63*a* and 63*b* between the Attribute table 61 and the Lov_groups table 62 preferably define the valid values that can be selected by users during data entry. Primitive attributes can contain a value from a Lov_groups item (optional loose link 63*a*). Dictionary attributes can contain a key from a Lov_groups item (optional loose link 63*b*).

Figure 6:
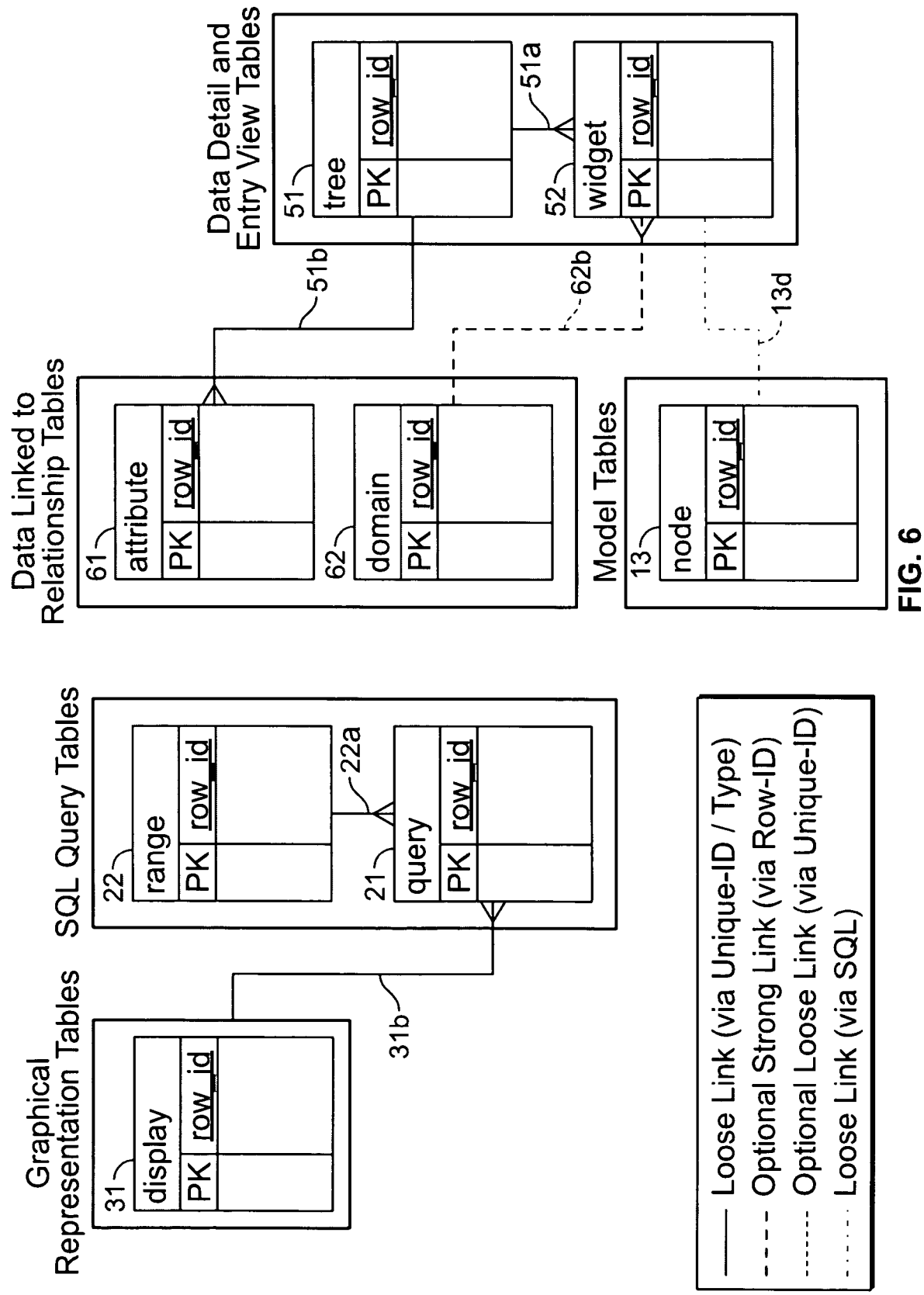
FIG. 6 shows a preferred detailed table structure for the handling of display and/or edit or input functions.

In the following, preferred table structure details for the handling of Display and/or Edit functions are described with reference to FIG. 6.

The tables for the handling of Display and/or Edit functions preferably contain the information needed to properly display detail information pages.

A Range table 22 contains information controlling which color the shapes should have when displaying query results (see FIG. 15(K)). Supported are both numeric ranges and textual ranges. In the case of a textual range, the returned value will be compared to the specified key using standard operators (equals, not_equals, begins_with, lower_than, etc). The resulting color will be used to render the corresponding shape. The Range table 22 preferably comprises the following attributes: Information to identify the range item (range_group, item order, unique item_name) and/or Range information (low-/high values, key value, key string operator and the shape color).

A Query table 21 contains all information necessary to display the result of an SQL statement in a model (see FIG. 15(L)). The SQL statement preferably is stored as text, but has to follow strict conventions to ensure that the query result contains exactly the number and types of columns necessary to be processed by the application properly. The Query table 21 preferably comprises the following attributes: Information for controlling the display of the results by specifying the model, the attributes which will be used as labels and/or popups for the shapes as well as the Drill-Down URL and the display size, the range group and the SQL statement and/or an optional comment.

A loose link 31b between the Query table 21 and Display table 31 specifies which type of model is to be used to display the results of an SQL query. A loose link 22a between the Range table 22 and Query table 21 is preferably used during or for the rendering of query results to determine the display values of the model shapes.

A Widget table 52 contains all the information necessary to control the layout and content of the nodes displayed on the detail pane of a tree page. A Tree table 51 contains the information necessary to build a tree page in conjunction with the Widget table 52. The Tree table 51 contains one record for each detail/edit page in the system. The main "logic" of the Tree table 51 is determined by the SQL statement contained in this table that creates a loose link 51b, to the Attribute Table 61. This SQL statement has to return records which define the nodes of the tree (e.g. label, position, parent, etc) and also the information necessary to retrieve, display and update the data of the node/mapping which is represented by the tree node. The SQL statement preferably is stored as text, but has to follow strict conventions to ensure that the query result contains exactly the number and types of columns necessary to be processed by the application properly.

Similarly, the records in the Node table 13 and Widget table 52 are not directly linked via a strong or loose link, but have to be linked by means of a loose SQL link 13d which uses SQL statements contained in the Tree table 51. This SQL statement of the loose SQL link 13d is to be obtained using the loose link 51a between the Tree table 51 and the Widget table 52. Because of these SQL-based loose links 13d, it is solely the responsibility of the Administrator to ensure that the widget information is correct. If the widget item is a domain, then there is an optional strong link 62b to the corresponding Domain table 62 entry. Together with the information about which node (in the tree) has been selected by the user, the data can be retrieved from the Attribute table 61 and displayed in the detail pane.

The Application Management Visualization Framework preferably is assisted by up of 3 Application Engines and/or several common functions. These Application Engines are:

a. A graphical user interface (GUI) Generation Engine 520, which is responsible for the creation of dynamic display templates based on Model, Meta Model and/or Meta Data stored in the database. Based on the complexity of the Meta Model and Model data Structures, this generation of display templates is necessary in order to achieve adequate system performance.

b. A Visualization Engine 510, which is responsible for creating visualizations of models, and if desired, executing user queries and/or merging the query results with the appropriate templates for display. The visualization engine preferably also controls the dynamic scaling of visual output.

c. A Scenario Engine 530, which is responsible for the creation and/or maintenance of model graphical representations of, and/or filters on, models.

The common functions explained herein below, are utilized preferably by all three engines 510, 520, 530 to perform repeated tasks.

Figure 7:
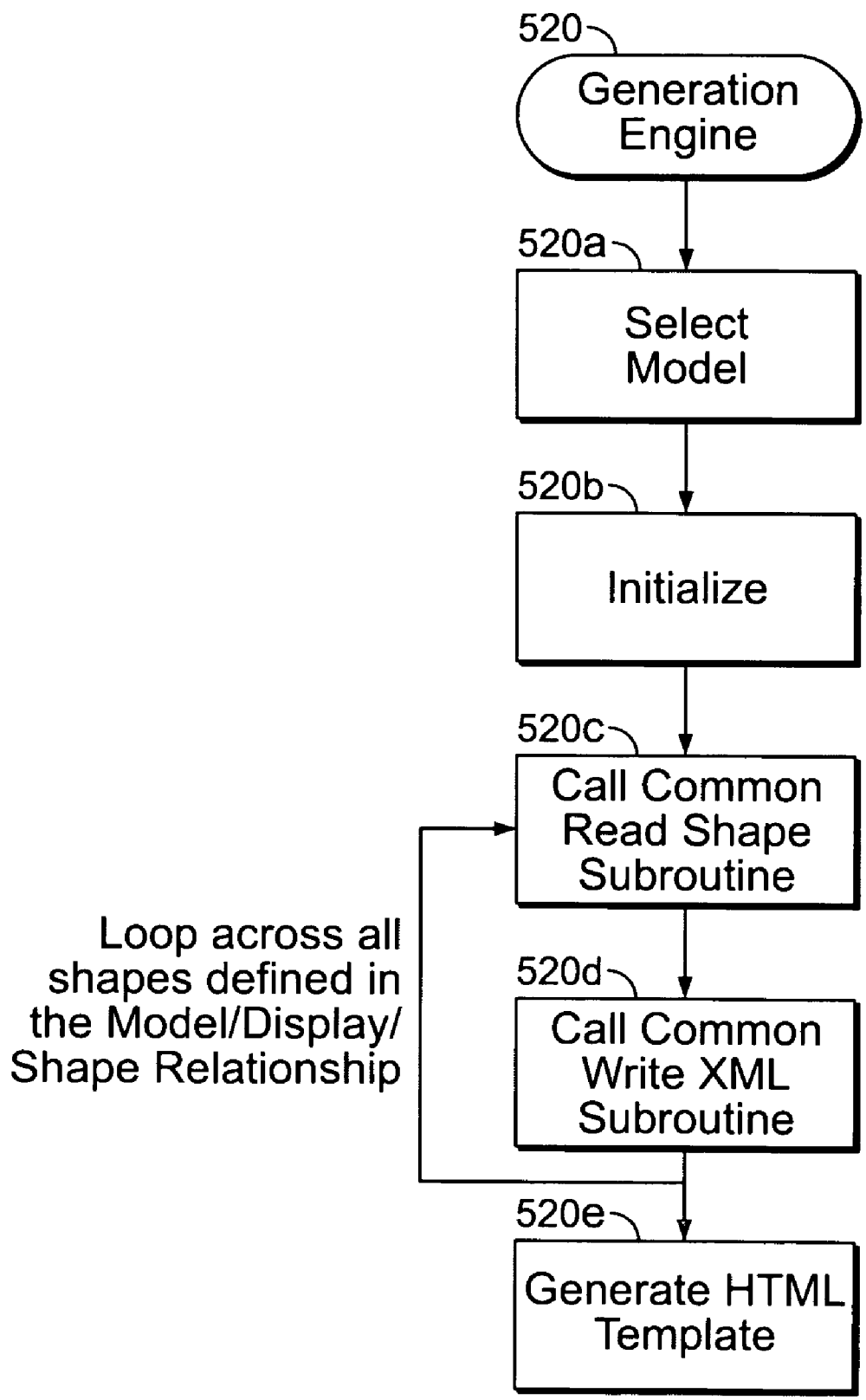
FIG. 7 shows a general workflow of the graphical user interface (GUI) generation engine according to a preferred embodiment of the invention.

In the following, a preferred workflow for the graphical user interface (GUI) Generation Engine 520 is described with reference to FIG. 7.

Figure 11:
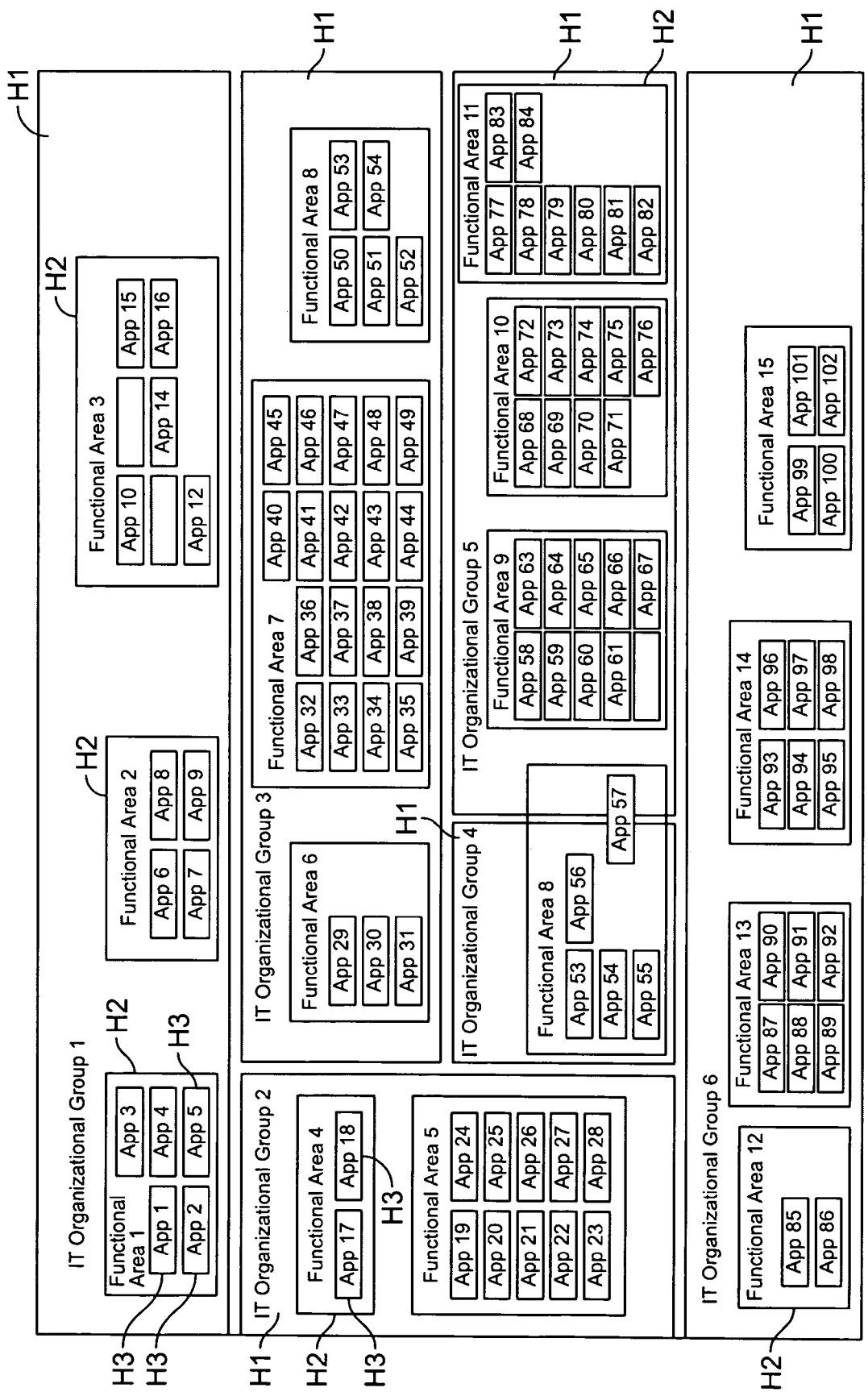
FIG. 11 shows an example visualized display template depicting the alignment of business applications to the organizations within the IT Department responsible for designing, building and/or maintaining these applications.
Figure 12:
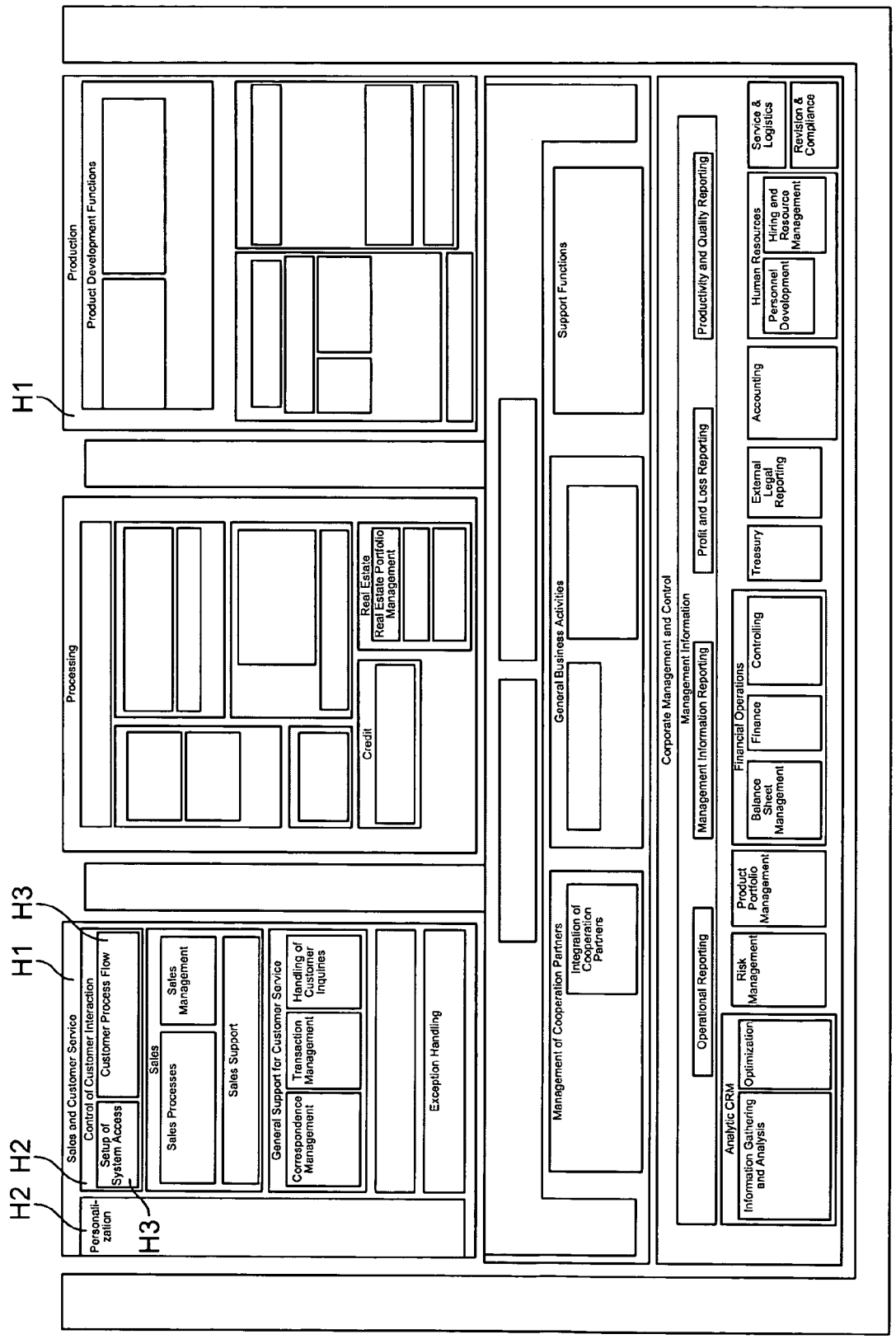
FIG. 12 shows an example visualized display template showing the mapping of detailed business functions to business operational areas.

The GUI Generation Engine 520 is triggered after a model has been loaded initially via the Scenario Engine 510 or when the ongoing maintenance of the models within the database 300/500 results in a new model being created. As input to the generation process, the appropriate model is selected 520a, and, based on this model, the display parameters are set 520b. For the model selected, the shapes attached to the model (accessed via strong links 11c and 31a) are iteratively read 520c from the respective Display table 31 and/or Shape table 32 stored in the database 300/500. As the shapes are read, the allowable shape attributes are read from the Attribute table 61 via loose links 13b and 13a. Then, the shape data and shape attribute data are written 520d to an output file, preferably an output xml file. When this read/write loop has processed all shapes related to the selected model, the output (xml) file is used to generate 520e a (preferably html) GUI template, which will be used by the Visualization Engine 510 to display query and/or analysis results. Sample (html) GUI templates are shown in FIGS. 11 and 12. The GUI templates generated by the GUI Generation Engine 520 (e.g. as shown in FIGS. 11 and 12) include a plurality of hierarchical levels H1, H2, H3, etc. which hierarchically structure the data or information. E.g. in FIG. 11 a first (highest) hierarchy H1 refers to a number of IT organizational groups, a second hierarchy H2 refers to specific functional areas for which a group (H1) is responsible and a third hierarchy H3 refers to the specific applications App1, App2, App3, etc. that have been deployed. Elements of the lower hierarchies may be also allocated to two or more higher hierarchy levels (see. E.g. the "Functional area 8" of the second hierarchy level H2 being allocated to the "IT Organizational Group 4" and to the "IT Organizational Group 5" of the first hierarchy level H1, and the "Appl 57" of the third hierarchy level H3 being allocated to the "IT Organizational Group 4" and to the "IT Organizational Group 5" of the first hierarchy level H1). The hierarchy levels H1, H2, H3, etc. at least partly preferably comprise a name specifying to the user to what the specific element refers to (e.g. "IT Organizational Group 1", or "Sales & Customer Service"). Even though in FIG. 11 the first hierarchy level H1 refers to IT Organizational Groups it should be understood that it may refer to other elements of an architecture or structure to be analyzed, such as i) business organizational units (e.g. Sales and Customer Services, Production, Management of Cooperation Partners, General Business Activities, Support Functions, Management Information, etc. for the hierarchical level H1) and subunits (e.g. "Personalisation", "Control of Customer Interaction", "General Support for Customer Service", "Sales Campaign Management", "Exception Handling", etc. for the hierarchical level H2) and specific processes within the subunits (e.g. "Customer Process Flow", Setup of System Access", "Sales Processes", "Sales-Management", "Sales Support", "Correspondence Management", Transaction Management", "Handling of Customer Inquiries", etc. for the third hierarchical level H3), etc., ii) specific automobile makes (e.g. BMW 328i, Rover Mini, etc. for the first hierarchical level H1), components of a specific automotive vehicle (e.g. engine, suspension, wheels, vehicle body, interior elements, etc. for the second hierarchical level H2), subcomponents (e.g. engine parts, suspension parts, tires, rims, body frames, doors, seats, instrument panel, safety systems, etc. the third hierarchical level H3), and related information (e.g. supplier(s), costs, general/customized part, etc. would be attributes of this third hierarchical level that can be queried and displayed, iii) production facilities e.g. for an automotive vehicle (e.g. engine manufacture, vehicle body manufacture, assembling, painting line, final control for the first hierarchical level H1), subunits (e.g. engine block machining, engine head machining, engine control unit building, engine assembling, etc. for the second hierarchical level H2), machines used in the subunits (e.g. drilling machine, casting machine, molding machine, etc. for the third hierarchical level H3), associated information and data (e.g. supplier(s), costs, general/customized machine, production speed, compatibility/incompatibility with other machines, etc. would be attributes of this third hierarchical level H3 that can be queried and/or displayed etc., or iv) software applications (e.g. Microsoft Office, Lotus123, Staroffice etc. for the first hierarchical level H1), edition belonging to (Standard Edition, Small Business Edition, Professional Edition, etc.), version, etc. for the second hierarchical level H2), programs within the application (e.g. Microsoft Word, PowerPoint, Excel, Outlook etc. for the third hierarchical level H3), type of functions included (e.g. word processing, image rendering, table computation, email management, address management, etc. for the fourth hierarchical level H4), etc. and associated information (e.g. costs, copyright-license type, etc.) would be attributes that can be queried and/or displayed.

Figure 8:
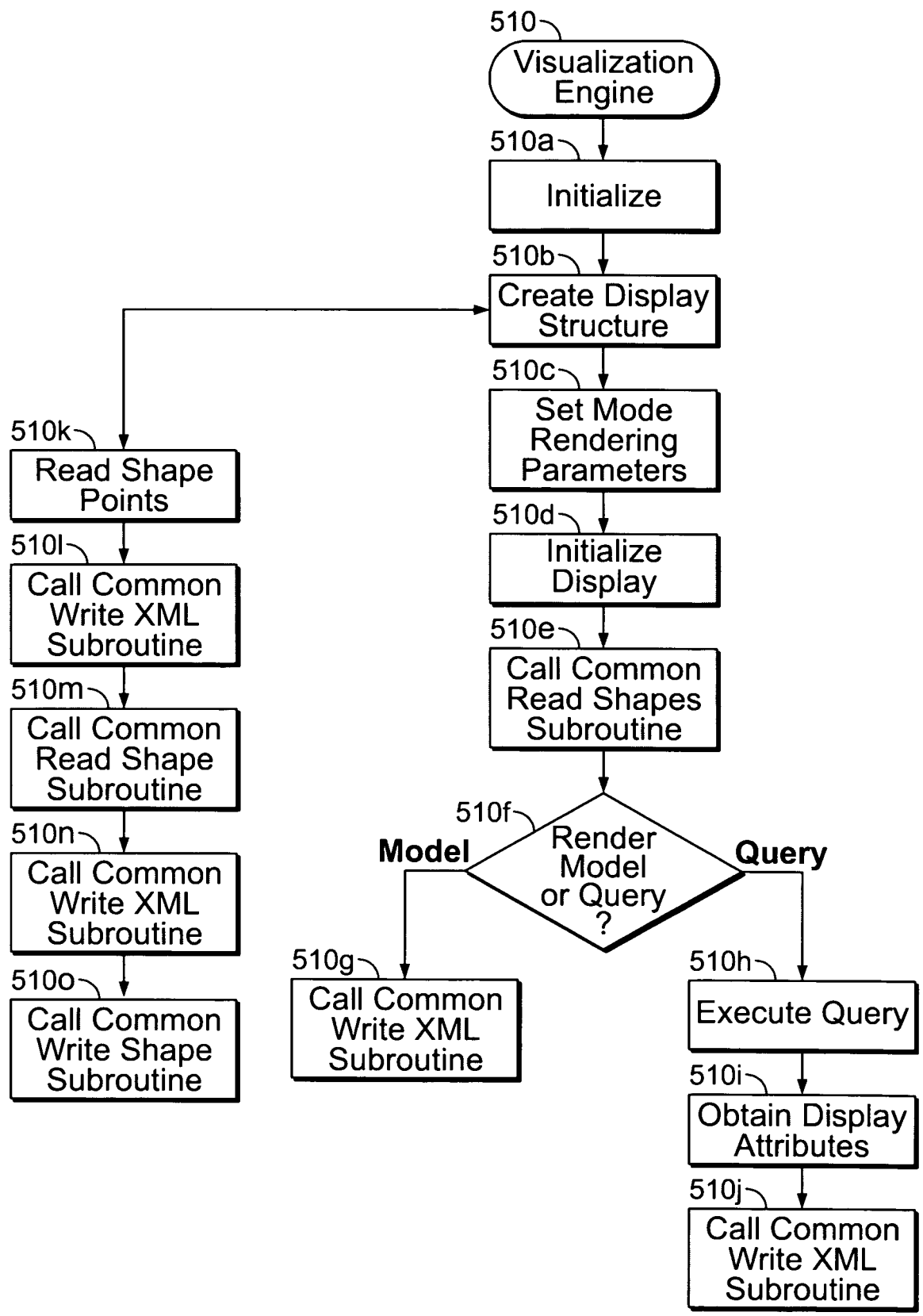
FIG. 8 shows a general workflow of the visualization engine according to a preferred embodiment of the invention.

In the following, a preferred workflow for the Visualization Engine 510 workflow is described with reference to FIG. 8.

The visualization process is initiated 510a when a user selects either a model or a query for display, along with the selection of an output size. Based on these inputs, the Visualization Engine 510 initializes 510b the underlying display structure by iteratively looping through the strong links 11c, 31a across the Model table 11, the Display table 31 and the Shape table 32 to obtain the shapes to be displayed, and writing this data to an XML file (Steps 510k-510o). The parameters needed for rendering the model are then set in step 510c. In step 510d, the background shapes and/or freeform shape border points are read from the Shape table 32. Based on the number of shapes to be displayed and the related information from the Display table 31, the maximum expansion or scaling factor of the output display preferably is also calculated in step 510d. In step 510e the Visualization Engine 510 reads the map-shapes for each node that has a shape representation via the optional strong link 13b and/or popup and label attributes for these shapes. At this point, the graphical information needed to display the model has been substantially obtained and processed.

Figure 13:
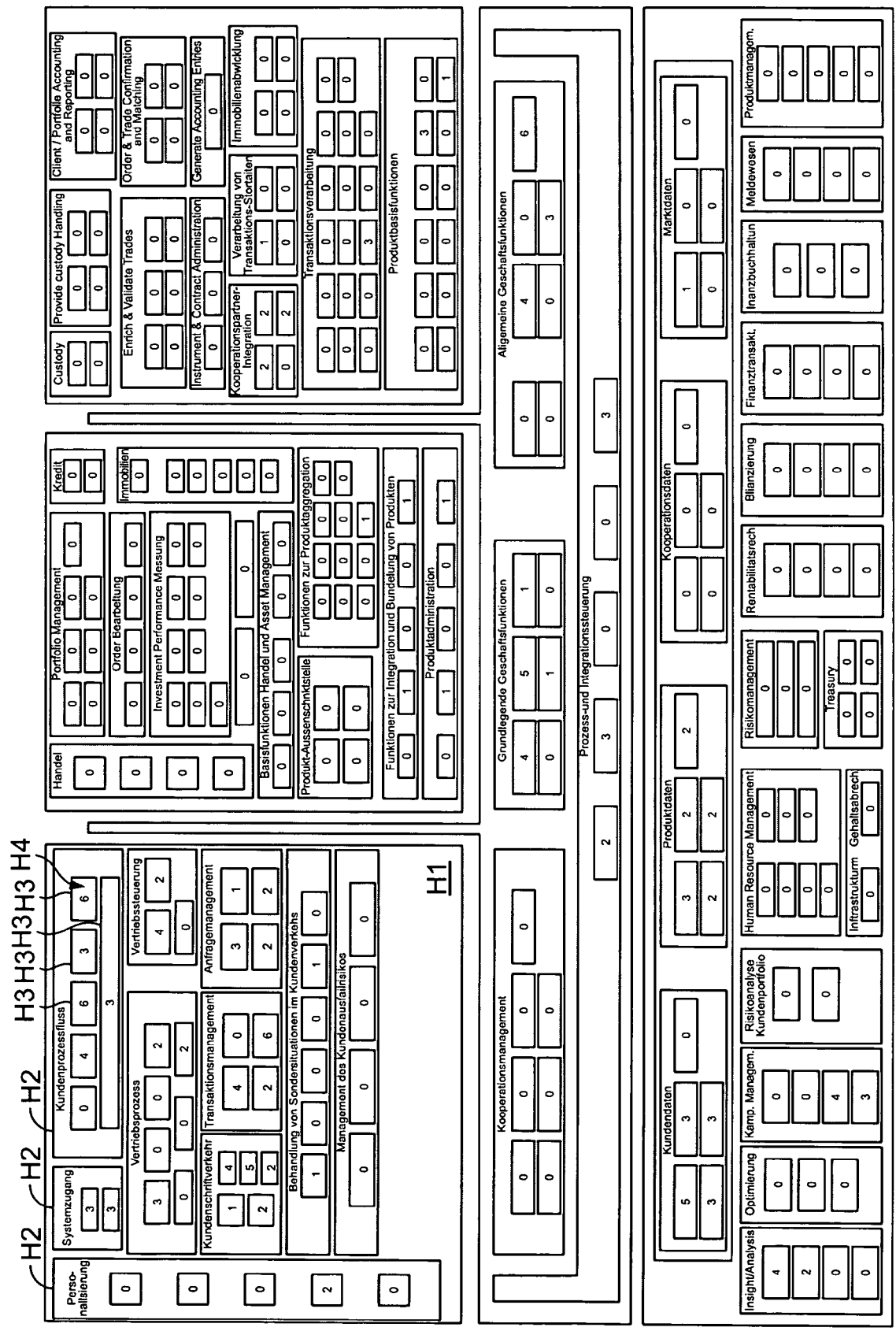
FIG. 13 shows a sample query visualization in which functions are fulfilled by applications "belonging" to a specific IT Department as well as the redundantly implemented functions. The basic template for this display is shown in FIG. 12.
Figure 14:
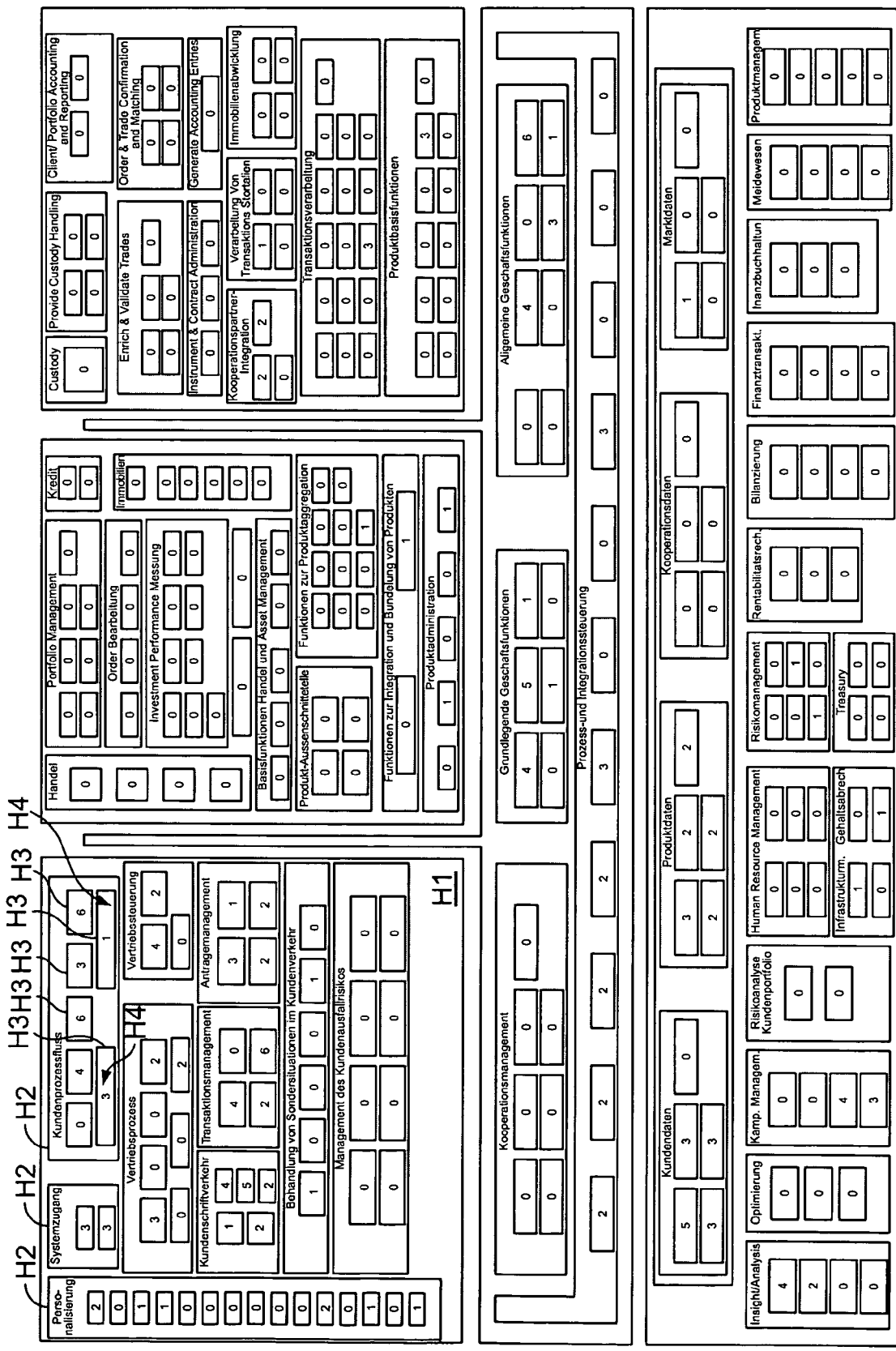
FIG. 14 shows an example of a query visualization in which functions are fulfilled by applications "belonging" to a specific IT Department as well as the redundantly implemented functions; Similar to FIG. 13, the basic template for this display is shown in FIG. 12, but the details reflect an alternative scenario.

If the user requested a model for display in step 510a, then this information is posted to a file, preferably an xml file, (510g) for display. If a query result is desired, then the Visualization Engine 510 constructs and executes the necessary SQL Statement (510h) to retrieve the raw Model Data from the Attribute table 61 and the Node table 13 (via the optional strong link 13a) for display. Based on the Model data returned in Step 510h, the Visualization Engine 510 retrieves in step 510i the appropriate display attributes from the Attribute table 61 and the Domain table 62 (via the strong link 62a), and sets the correct display parameters (color, rendering, etc.) based on this data for each shape to be displayed. Once preferably all display nodes have been processed, the results are written 510j to a (preferably xml) File for display. A sample query display is shown in FIG. 13. Accordingly, starting from the GUI templates generated by the GUI Generation Engine 520, the Visualization Engine 510 generates specific scenarios using the hierarchy information, in particular the hierarchical levels H1, H2, H3, etc. generated by the GUI Generation Engine 520. E.g. in the scenarios shown in FIGS. 13 and 14 an analysis of functional redundancies for specific clusters is given: in FIG. 13 e.g. for the element of the hierarchical level H1 referring to a "Sales & Customer Service" (not shown in FIGS. 13 and 14) the element "Kundenprozessfluss" of the second hierarchical level H2 six elements (e.g. specific applications or functions) of the third hierarchical level H3 are given. Based on the results obtained in the visualization process an element of a fourth hierarchical level H4 is added for each element (e.g. specific applications or functions) of the third hierarchical level H3, the element of the fourth hierarchical level H4 being e.g. the number of times a specific application or function is implemented (e.g. "6" for the rightmost function within the element "Kundenprozessfluss"). When viewed online, the detailed attributes for the information displayed can be viewed in a pop-up window preferably using (e.g. standard html) "on mouse over" functionality. Placing the mouse cursor over the rightmost function within the element "Kundenprozessfluss" would result in the automatic display of the 6 application names that implement this function.

In some cases, the number of nodes to be displayed varies from scenario to scenario reflecting potential changes in the architecture. In order to accommodate these variances, the Visualization Engine 510 changes the relative size of the shapes used to depict the hierarchical levels above the node based on inputs obtained by means of the GUI Generation Engine 520. An example of the dynamic nature of the visualization process can be seen by comparing FIG. 13 and FIG. 14. Here the lower element (e.g. specific application or function) of the hierarchical level H3 "Kundenprozessfluss" in FIG. 13 is split up into two elements (e.g. more refined-specific application or function) of the hierarchical level H3 in FIG. 14, wherein elements of the fourth hierarchical level H4 are added for each newly created or split element of the third hierarchical level H3, wherein the newly added elements of the fourth hierarchical level H4 are separately created for each elements (e.g. more refined specific application or function) of the hierarchical level H3; e.g. in FIG. 13 the specific function was implemented three times so that the element of the fourth hierarchical level H4 was "3" in FIG. 13 while after the change in architecture or structure leading to a splitting of this function into two more refined functions of the third hierarchical level H3 shown in FIG. 14, the left function of the third hierarchical level H3 is implemented three times so that the element of the fourth hierarchical level H4 therefore is "3" while the right function of the third hierarchical level H3 is implemented only one time so that the corresponding element of the fourth hierarchical level H4 is "1". A similar splitting has taken place for the element "Personalisierung" of the hierarchical level H2 which in FIG. 13 has only five corresponding elements (e.g. applications or functions) of the hierarchical level H3 while in FIG. 14 the element "Personalisierung" of the hierarchical level H2 was refined or altered to have 15 corresponding elements (e.g. applications or functions) of the hierarchical level H3.

Moreover, the Visualization Engine 510 preferably generates a "fingerprint" display, where at least one element of a lower hierarchical level (e.g. hierarchical level H3) which is present in several elements of a higher hierarchical level (e.g. hierarchical level H2) are marked or rendered in a same/similar way (e.g. highlighted, made bold, colored in a specific color, etc.) throughout the display thus generating a "fingerprint". Accordingly, with this "fingerprint" display it can be very easily analyzed where in a structure or architecture a specific element is used or implemented, e.g. where in the IT Organizational Groups and Functional Areas a specific application is used or implemented, which part of a car is supplied by a specific supplier, which part of a car is supplied by one, two, three, etc. separate suppliers (e.g. in view of analyzing possible problems in a supply chain, since if one part is supplied only by one supplier in case such supplier is not able to deliver due to a strike, bankruptcy, etc., the supply chain for the specific part would be interrupted). Further, by clicking the details of the fingerprint display, the user is automatically taken to the associated maintenance screens for that element. This improves the usability and easy maintenance of the underlying details (e.g. adding or removing a parts supplier).

Figure 9:
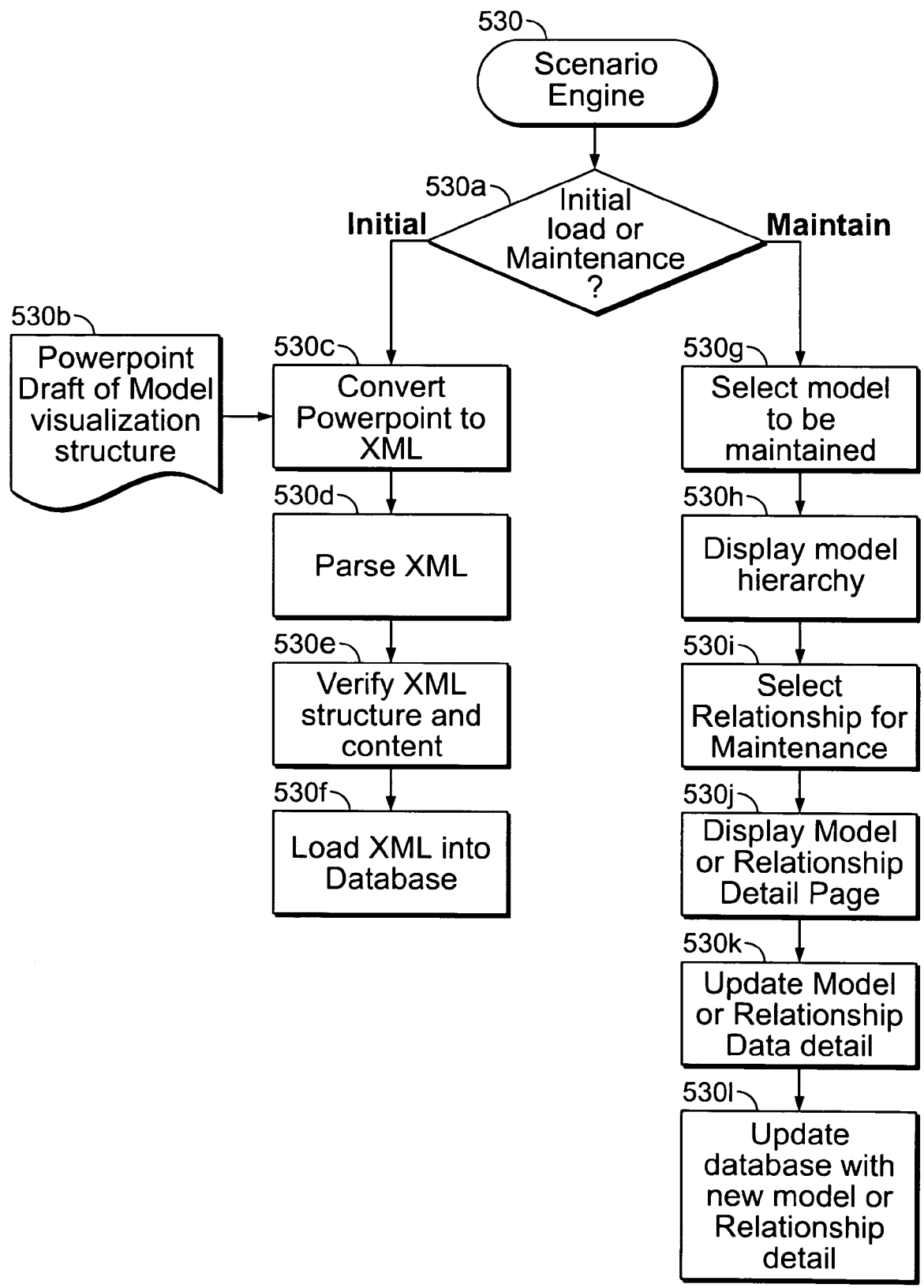
FIG. 9 shows the general workflow of the scenario engine according to a preferred embodiment of the invention.
Figure 10A:
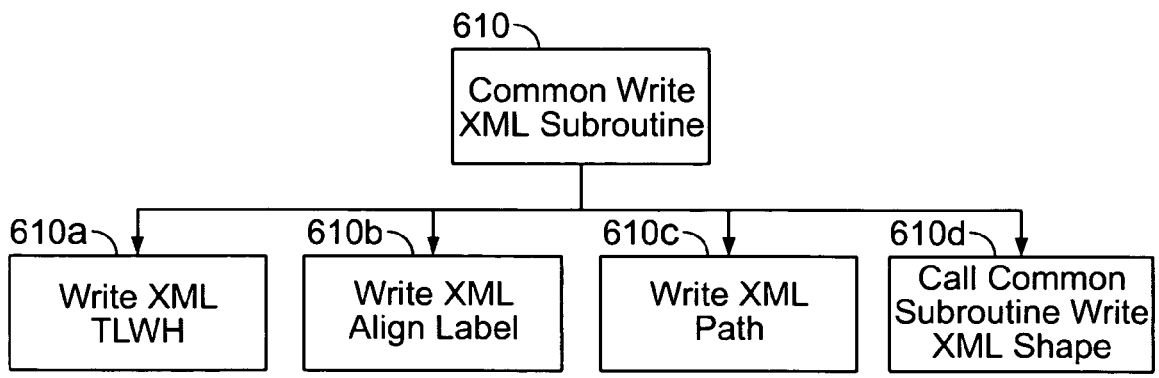
FIG. 10 shows a general structure of common subroutines according to a preferred embodiment of the invention.
Figure 10B:
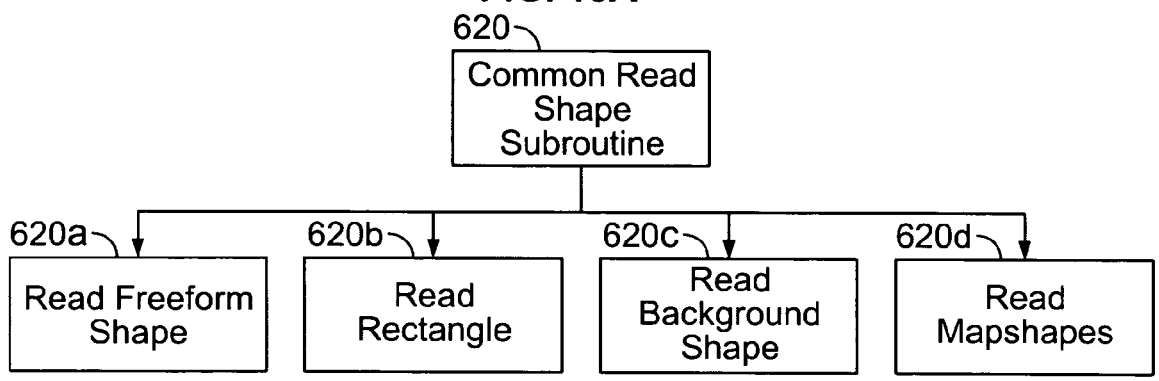
Figure 10C:
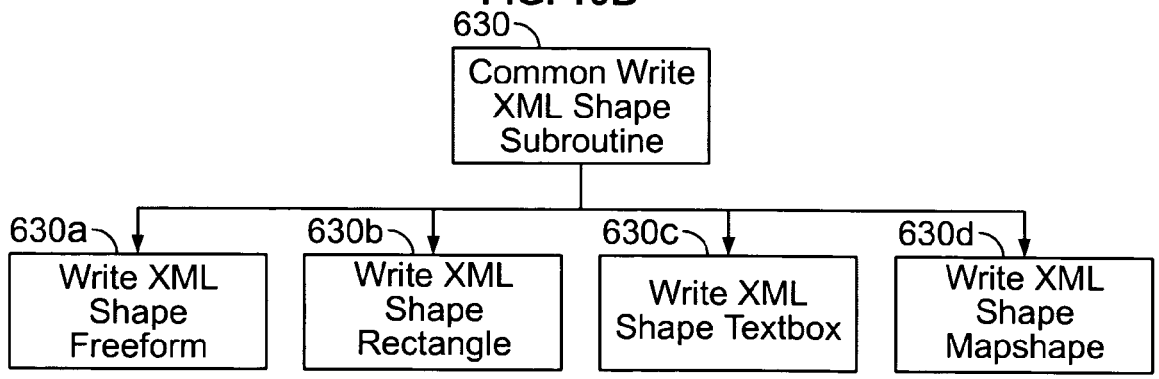
Figure 10D:
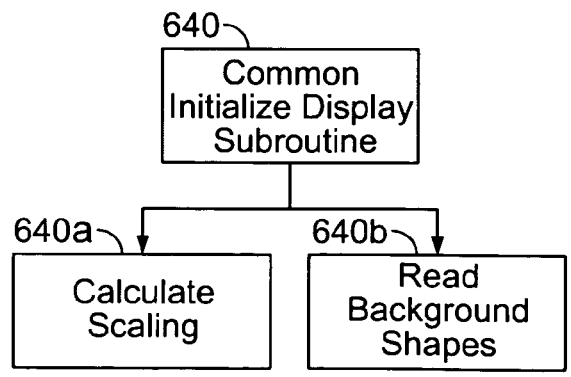

In the following, a preferred workflow for the Scenario Engine 530 is described with reference to FIG. 9.

The Scenario Engine 530 preferably fulfills two requirements, namely the ability to initially load a visual representation of a Model 10 into the database 300/500, and the ability to create scenarios or ongoing variations of existing model structures. The initial load of a model visual structure is done by (preferably manually) creating 530*b* a picture of how the model should look. This can be typically done using Microsoft PowerPoint although this is not necessary. Any tool that delivers a graphical rendering that can be converted to a defined xml structure would work. This graphic is converted 530*c* to xml, and the resulting xml is parsed 530*d*. The parsed xml is verified structurally 530*e* to ensure that it conforms to database requirements. The verified structure is then loaded 530*f* into the database. This step of loading 530*f* creates the necessary entries in the Model table 11, the Display table 31, the Shape table 32, the Node_class table 12 and/or the Node table 13, as well as establishing the strong links (11*a*, 11*b*, 11*c*, 12*b*, 13*b*, 31*a*) between these entries into the respective tables 11, 31, 32, 12, 13.

For data maintenance, an existing model is selected 530*g* and the corresponding model hierarchy is read from the Tree table 51 and displayed 530*h*. From this representation, the desired level within the hierarchy to be maintained is selected 530*i* and the corresponding detail information read and displayed 530*j* from the appropriate tables (typically the Attribute table 61, the Mapping table 41 and/or the Node table 13). This information is updated 530*k* (preferably online) and then saved 530*l* into the database 300 along with the audit trail information.

The Common Functions depicted in FIG. 10 are:

a. A Write xml Subroutine 610 for writing XML files which provide the basic structure for exchanging information within the Application Management Visualization Framework. During execution, these files need to be continually updated with specific information regarding the graphics to be generated. The Write xml routine 610 preferably has one or more of the following functions:

Write xml TLHW (610*a*): writes the positional information of an object/shape (top, left, width, height) to the xml file;

Write xml Align Label (610*b*): writes the entry for the object/shape specific label and label alignment information to the xml file;

Write xml Path (610*c*): writes the shape path (corner points) for freeform objects/shapes to the xml file; and Write xml Shape (610*d*): an imbedded common routine for writing shapes.

b. A Read Shape Subroutine 620 preferably has one or more of the functions, which are responsible for formatting and executing the SQL statements necessary to read the different object shapes from the Shape table 32 for each node to be displayed (via the optional strong link 13*b*). As each shape contains differing structures, attributes, etc., each is processed by a unique function within the sub-routine analogous to the functions described for the common Write xml subroutine.

c. A Write xml Shape subroutine 630 preferably has one or more of the functions, which are responsible for writing the shape structure data to the xml file. These functions validate the shape attribute data being written to ensure the shapes can be rendered properly. As each shape contains differing structures, attributes, etc., each is processed by a unique function within the sub-routine analogous to the functions described for the common Write xml subroutine.

d. An Initialize Display Subroutine 640 preferably has two functions: One calculates 640*a* the appropriate scaling factor to be applied to a visualization depending on the calculated screen space utilized and the required output size; the second function 640*b* reads the background shapes for the model being displayed.

Figure 16:
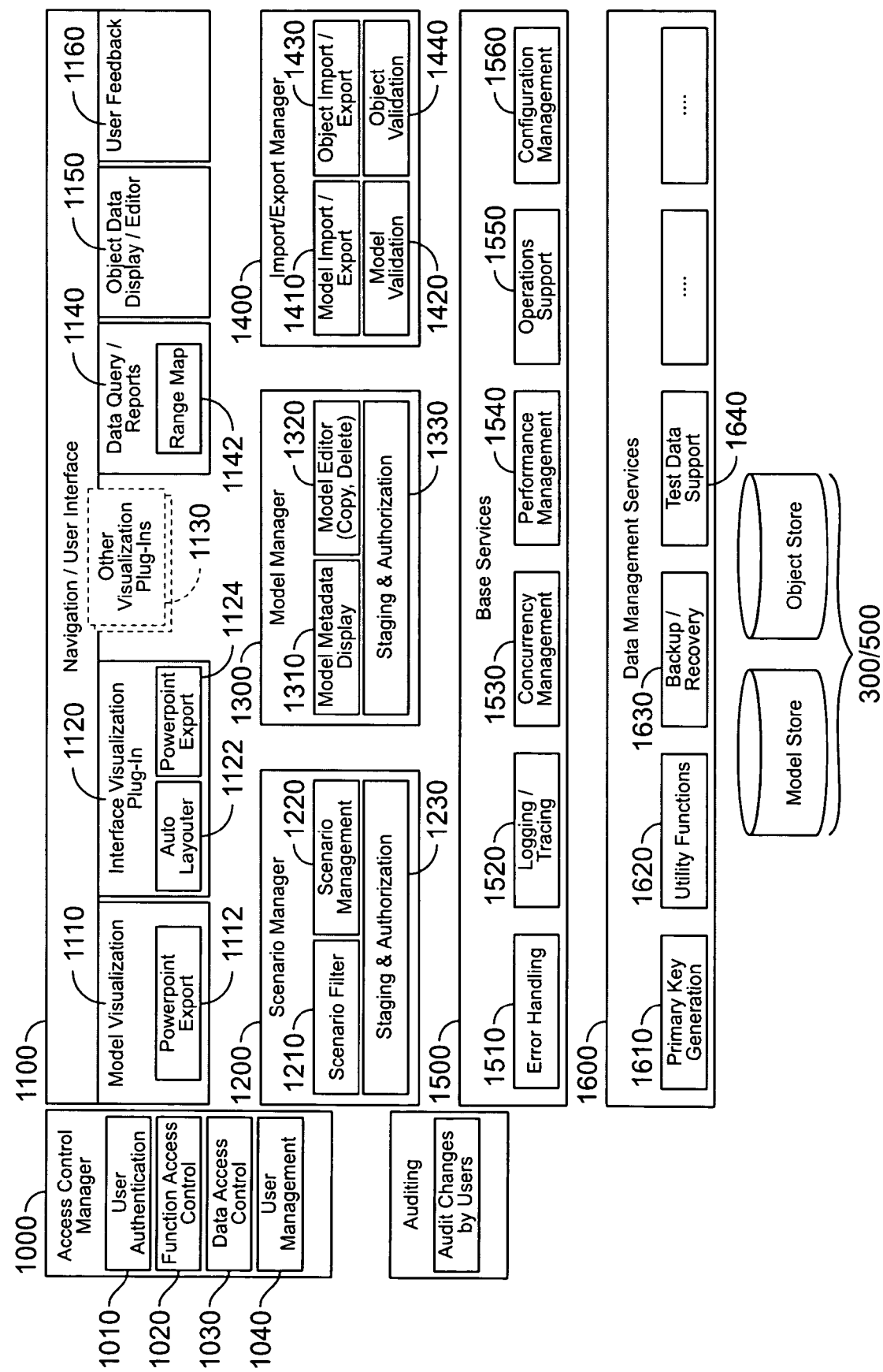
FIG. 16 shows preferred functional blocks and/or features of the preferred Application Management Visualization Framework (AMVF)

In the following, preferred functional blocks, tools and/or features of the Application Management Visualization Framework (AMVF) are described with reference to FIG. 16.

The Application Management Visualization Framework according to a preferred embodiment preferably comprises an Access Control Manager 1000, which controls and manages accesses of users to the AMVF and comprises:

an User Authentication 1010 preferably using "Windows" Authentication of NET Framework, wherein the Microsoft Internet Information Services Server (IIS) gets the User Credentials from the Internet Explorer;

a Function Access Control 1020 preferably using the mechanism used in NET Samples (Best Practices);

an Access Control 1020 realized via predefined User Roles in the database, wherein one default group is set where all users belong to if not assigned to an other group;

a Data Access Control 1030, which maybe realized via Views or assignment of rights to special nodes;

a User Management 1040, preferably via database updates per SQL.

The Application Management Visualization Framework preferably further comprises an Auditing 1050 that audits changes and/or inputs performed by users. In particular, the Auditing 1050 provides for Data Change columns so that in preferably every table there is a "created_by" and "last_updated_by" column (preferably with corresponding time-stamps) to help identify which user has created or updated a certain column, and for Data Updates/Deletes, which can preferably be implemented by an Audit Log table containing the audit entries and/or an Audit Shadow table of each data table containing the deleted or updated row before the update. Auditing also could possibly done via Triggers.

The Application Management Visualization Framework preferably further comprises a Navigation/User Interface 1100 e.g. by using one of provided NET portal examples as a starting point and integrate the main navigation into a sample. Moreover, the Navigation/User Interface 1100 provides for Menu Entries which preferably are configurable, at least with respect to the detail entries under the main entries, also depending on the users access rights.

The Application Management Visualization Framework preferably further comprises:

A Model Visualization 1110, which preferably uses commercially available components for the generation of web based graphics such as PopChart™ and Optimap™ from Corda Technologies Inc. and generates a PCXML file from the database 300/500. Instead of creating a file, the PCXML stream could be passed via http;

an Interface Visualization 1120, which preferably uses commercially available components to generate the Application Images. Moreover, a Graph Layout algorithm is preferably integrated to align the applications and to draw the Interfaces between them and/or an Auto Layouter 1122 is provided, which preferably uses a "Spring Embedder"-like Graph-Algorithm or the like;

At least one PowerPoint Export 1112, 1124, which preferably uses Office Automation to generate a PowerPoint from the Shape definitions used by the selected commercially available graphics generation components and/or to provide this file for download on the Server. Alternatively or additionally, commercially available graphics generation components can be used to generate EMF that can be converted to a PowerPoint Drawing;

One or more other Visualization Plug-Ins 1130 for visualizing the data into other (predetermined or predeterminable) formats;

A Data Query 1140, wherein Data Queries are stored preferably as plain text SQL statements in the database 300/500. These statements preferably have to follow a strict convention to return all the attributes of the shapes that should be colored or highlighted. Moreover, Queries can have a certain number of parameters (e.g. "_PAR1_") that will be replaced (string replacement) by the parameters passed when the Query Method will be called to allow for flexibility. Moreover, the Data Query 1140 preferably comprises a Range Map 1142, which preferably are based on the Range maps defined by the selected commercially available graphics generation components; numerical range maps are preferably generated out of a predefined range map. For textual maps (based on keywords), a pseudo-numerical map is preferably used which maps each keyword to an integer value An Object Data Display/Editor 1150 using a Tree View (similar to the explorer tree, see e.g. FIG. 17(A)) to display and/or navigate through the model (e.g. on the left side of the page); adjacent to the Tree View (e.g. on the right side of the page) there is preferably displayed a top section containing the attributes of the selected node and a lower section with the attributes of the selected mapping (if one is selected). One or more Navigation Buttons may be provided preferably including "Expand All", "Collaps All", "Expand All Nodes With Data Element", "Search", etc. Moreover, an Edit Mode may be provided with which the user can Delete Entries and/or Create New Entries. When creating New Entries, the Attributes will be filled with the Default Values and Mandatory Fields as well as Maximum/Minimum constraints will be checked when the users saves the node. The same applies when the User edits existing entries. Moreover, the Object Data Display/Editor 1150 preferably displays a data grid (see FIG. 17(B)) for Sets, Dictionaries and/or Collections: For Sets, the Item shows the Index (read only); for Dictionaries, the Key is shown and can be changed, wherein for LOV based Dictionary, only keys from the LOV group can be selected. Additionally, Item Comments may be provided so that if the domain has comments, the comment column will be shown (can be editable).

A Scenario Manager 1200, which comprises one or more Scenario Filters 1210, according to which one or more Scenarios are implemented by creating a view for each table which includes all tables and has a "WHERE scenario_id='<ID>'" filter clause. The views preferably have the same name like the table with the appended scenario-ID ("_<ID>"). All SQL-Statements (and also the statements in the database 500/300) will be processed preferably during runtime to replace the original-table-names with the view names. Moreover, the Scenario Manager 1200 comprises a Scenario Management 1220, according to which stored Procedures are created to copy one scenario to another (e.g. to create the view, copy all rows from one view to the other, update and/or correct the cross-references). Other Stored Procedures could be provided to delete Scenarios or maybe to compare Scenarios, and a Staging & Authorization 1230, according to which one Scenario is always the "Base" scenario. The ID of this scenario will be stored in a global configuration table. To make a certain scenario to the new base scenario, only it's name has to be set in this config table. Moreover, a function Locking of Scenarios may be provided to "lock" scenarios to prevent "normal users" to be able change the data. Locks preferably do not apply when power-users use SQL to access the database.

A Model Manager 1300 comprising a Model Metadata Display 1310 for the graphical representation of the model, wherein a PowerPoint slide is created containing all shapes (background and node-related shapes), as e.g. shown in FIGS. 11 to 14. The node-related shapes do only contain the unique_id of the node. This slide can be edited and later used to update the graphical representation. For the model data itself, an XML file is preferably generated which can be edited with any XML or Text editor. Furthermore, the Model Manager 1300 comprises a Model Editor 1320 for copying and/or deleting models, wherein for the graphical representation, a PowerPoint-Slide is created. The Model Editor 1320 contains all the shapes. Shapes that are attached to nodes have to have the unique_id of the node as text. A PowerPoint macro preferably generates a file that is further processed to import the graphical representation (either XML or SQL-Statements, etc.) into the database 500/300. For the tree model itself, an XML file is preferably used to modify the model itself. Finally, the Model Manager 1300 comprises a Staging & Authorization function 1330, wherein graphical representation of models and models itself can be either imported into an existing scenario with a new id or into a new scenario;

An Import/Export Manager 1400 comprising a Model Import/Export 1410 according to which models are exported and/or imported preferably via XML, a Model Validation 1420 which uses a Stored Procedure to validate the data for a model, e.g. that referential integrity is valid, that only supported codes are in code-specific columns, etc. The Stored Procedure returns the records that violates certain rules and preferably supports the power-user when working with SQL to change the models. The Import/Export Manager 1400 further comprises an Object/Mapping Import/Export 1430 according to which one or more object mappings are imported and/or exported via XML, an Object Validation 1440, which uses a Stored Procedure to validate the data for a model, e.g. that referential integrity is valid, that only supported codes are in code-specific columns, etc. The Stored Procedure returns the records that violates certain rules and preferably supports the power-user when working with SQL to change the models;

One or more Base Services 1500 comprising one or more of the following functions: Error Handling 1510, which preferably uses the mechanisms that the NET Framework provides; Logging/Tracing 1520, which preferably uses the mechanisms that the NET Framework provides; Concurrency Management 1530, which preferably uses best practices to ensure that multiple users can use the application concurrently; Performance Management 1540; Operations Support 1550, which preferably uses the .NET Framework mechanisms (e.g. Windows Event Log) to provide an Interface for the Systems Operations; and/or Configuration Management 1560, according to which Configuration Information is stored in the database 300/500 unless it is required before the database connection could be established;

One or more Data Management Services 1600 comprising one or more of the following functions: Primary Key Generation 1610, according to which, since the SQL-Server does not support sequences, an embedded procedure DLL increments a single row in a table to create the unique ID; one or more Utility Functions 1620, which are usually implemented in stored procedures (e.g. to copy scenarios, clear scenarios, enabling/disabling of constraints, etc.); Backup/Recovery 1630, which defines and/or supports by means of scripts the mechanisms to backup the data and/or possibly restore (parts of) the database 500/300; Test Data Support 1640, which comprises utility functions to generate test data, probably by SQL scripts and/or stored procedures.

It should be understood that even though the invention and its preferred embodiments were described mainly with reference to IT architectures and structures, the inventive Application Management Visualization Framework can be also applied to the capturing, aggregating and/or visualizing of structural data of architectures of technical equipment and/or businesses other than IT architectures.

A number of embodiments of the invention have been described. Nevertheless, it will be understood that various modifications may be made without departing from the spirit and scope of the invention. Accordingly, other embodiments are within the scope of the following claims.

What is claimed is:

1. A computerized information system for capturing, aggregating, and visualizing model structural data representing an information technology architecture, the system comprising:
   storage medium
   at least one abstracted data model;
   a graphical user interface generation engine;
   a visualization engine;
   a scenario management engine configured to simulate, visualize and evaluate changes in the architecture;
   at least one data capture engine configured to capture and aggregate data stored on the storage medium according to a structured, hierarchical model which is adapted to provide a structured, hierarchical view of a model structure and to build a basic frame for analysis and visualization, the model being either a standardized model or a customer specific model; and
   a display engine configured to generate a plurality of different displays of the captured data according to the structured hierarchical model;
   wherein the structured, hierarchical model comprises tables of related records, which are associated by either strong links or loose links,
   wherein the strong links make use of Row-IDs, and are adapted to provide for every record having a foreign key relationship to a primary key of a record in another table, and
   wherein the loose links make use of a row's Row-ID, and are adapted to provide for establishing a foreign key relationship to another table,
   wherein the models and their components are strongly coupled together by at least one strong link, and relationships between models are loosely coupled by one or more loose links adapted to allow that end points of the respective relationship are moveable within a model or are removable without forcing the relationship to be removed as well,
   wherein a generic representation of a model is represented by strong links between core model tables and graphical representation tables.

2. The system of claim 1, wherein the data capture engine comprises at least one database configured to store the data according to the structured, hierarchical model.

3. The system of claim 1, wherein the hierarchical model comprises one or more types of nodes and the tables that correspond to the structure of the hierarchical model comprise:
   a model table configured to comprise one or more attributes of the hierarchical model;
   a Node_Class table configured to comprise information related to the types of nodes in the hierarchical model; and
   a Node table configured to comprise a definition of each node within the hierarchical model and hierarchy information for each node corresponding to the relationship of each node to the hierarchical model.

4. The system of claim 3, wherein the model table, the Node_Class table and the Node table are linked to each other by a plurality of strong links, each strong link defining one or more dependencies of data in a first set of one or more tables to data in a second set of one or more tables, each strong link defining the underlying structure of the hierarchical model.

5. The system of claim 3, wherein the hierarchical model further comprises:
   an Nclass_Group table configured to comprise information defining a group of the types of nodes in the hierarchical model within the Node_Class table that build a pool of nodes within a mapping;
   a Domain table configured to comprise information defining data element types that belong to a node, data element types that belong to a mapping, and data structures stored within the hierarchical model;
   an Attribute table configured to comprise operational data associated with a node and operational data associated with a mapping;
   a Display table configured to comprise information defining a graphical representation of a specific view of the hierarchical model;
   a Shape table configured to comprise one or more graphical parameters defining how node information is displayed, wherein the node information comprises the specification of a position, a size, a shape, and a background;
   a Range table configured to comprise color information corresponding to shapes for displaying a shape as part of a query result;
   a Query table configured to comprise display information defining how a result of an SQL statement executed on the hierarchical model is displayed;
   a Widget table configured to comprise layout information defining a layout of the nodes;
   and a Tree table configured to comprise information defining how to build a tree page based on the Widget table.

6. The system of claim 1, wherein the system further comprises a graphical user interface engine configured to generate graphical user interface screens based on the hierarchical model, the graphical user interface screens comprising:
   one or more data attributes from the hierarchical model; and
   operational data from the hierarchical model.

7. The system of claim 6, wherein the graphical user interface engine is configured to generate the graphical user interface screens based on the information contained in at least one of a Display table, a Shape table, a Range table and a Query table, the hierarchical model further comprising:
- an Nclass_Group table configured to comprise information defining a group of node_classes within a Node_Class table that build a pool of nodes within a mapping;
- a Domain table configured to comprise information defining data element types that belong to a node, data element types that belong to a mapping, and data structures stored within the hierarchical model;
- an Attribute table configured to comprise operational data associated with a node and operational data associated with a mapping;
- the Display table configured to comprise information defining a graphical representation of a specific view of the hierarchical model;
- the Shape table configured to comprise one or more graphical parameters defining how node information is displayed, wherein the node information comprises the specification of a position, a size, a shape, and a background;
- the Range table configured to comprise color information corresponding to shapes for displaying a shape as part of a query result; and
- the Query table configured to comprise display information defining how a result of an SQL statement executed on the hierarchical model is displayed.

8. The system of claim 7, wherein the system further comprises a scenario engine configured to generate a visual representation of the structured, hierarchical model into a database and/or for generating a plurality of scenarios or ongoing variations of the structured, hierarchical model.

9. The system of claim 8, wherein the display engine comprises a visualization engine for creating a visualization of the structured, hierarchical model, executing user queries, merging the query results for display and/or controlling the dynamic scaling of visual output.

10. The system of claim 9, wherein the visualization engine is further configured to:
- read one or more shapes associated with the hierarchical model from the Shape table;
- read one or more shape attributes associated with the read shape from the Attribute table;
- generate shape data from the read shape; and
- write the shape data and the shape attributes to an output XML file.

11. A machine-implemented method of capturing, aggregating, and visualizing model structural data representing an information technology architecture, the method comprising:
- capturing and aggregating data according to a structured, hierarchical model which is adapted to provide a structured, hierarchical view of a model structure and to build a basic frame for analysis and visualization, the model being either a standardized model or a customer specific model;
- defining the structured hierarchical model to comprise tables of related records, which are associated by either strong links or loose links, wherein the strong links make use of Row-IDs, and are adapted to provide for every record having a foreign key relationship to a primary key of a record in another table, wherein the loose links make use of a row's Row-ID, and are adapted to provide for establishing a foreign key relationship to another table, wherein the models and their components are strongly coupled together by at least one strong link, and relationships between models are loosely coupled by one or more loose links adapted to allow that end points of the respective relationship are moveable within a model or are removable without forcing the relationship to be removed as well, wherein a generic representation of a model is represented by strong links between core model tables and graphical representation tables; and
- generating a plurality of different displays of the captured data according to the structured, hierarchical model.

12. The method of claim 11 farther comprising storing the data according to the hierarchical model in at least one database, wherein the data is stored in a plurality of database tables corresponding to the structure of the hierarchical model.

13. The method of claim 11, wherein the hierarchical model is defined to comprise:
- a model table configured to comprise one or more attributes of the hierarchical model;
- a Node_Class table configured to comprise information related to types of nodes in the hierarchical model; and
- a Node table configured to comprise the definition of each node within the hierarchical model and corresponding hierarchy information.

14. The method of claim 13, wherein the model table, the Node_Class table and the Node table are linked to each other by a plurality of strong links which make use of the Row-ID of the respective table, each strong link defining one or more dependencies of data in a first set of one or more tables to data in a second set of one or more tables, each strong link defining the underlying structure of the hierarchical model.

15. A computer storage medium encoded with a computer program for capturing, aggregating, and visualizing model structural data representing an information technology architecture, the program comprising instructions that when executed by data processing apparatus cause the data processing apparatus to perform operations comprising:
- capturing and aggregating data according to a structured, hierarchical model which is adapted to provide a structured, hierarchical view of a model structure and to build a basic frame for analysis and visualization, the model being either a standardized model or a customer specific model;
- defining the structured, hierarchical model to comprise tables of related records, which are associated by either strong links or loose links, wherein the strong links make use of Row-IDs, and are adapted to provide for every record having a foreign key relationship to a primary key of a record in another table, wherein the loose links make use of a row's Row-ID, and are adapted to provide for establishing a foreign key relationship to another table, wherein the models and their components are strongly coupled together by at least one strong link, and relationships between models are loosely coupled by one or more loose links adapted to allow that end points of the respective relationship are moveable within a model or are removable without forcing the relationship to be removed as well, wherein a generic representation of a model is represented by strong links between core model tables and graphical representation tables; and
- generating a plurality of different displays of the captured data according to the structured, hierarchical model.

16. The computer storage medium of claim 15, wherein the operations further comprise storing the data according to the hierarchical model in at least one database, wherein the data is stored in a plurality of database tables corresponding to the structure of the hierarchical model.

17. The computer storage medium of claim 15, wherein the hierarchical model is defined to comprise:
- a model table configured to comprise one or more attributes of the hierarchical model;
- a Node_Class table configured to comprise information related to types of nodes in the hierarchical model; and
- a Node table configured to comprise the definition of each node within the hierarchical model and corresponding hierarchy information.

18. The computer storage medium of claim 17, wherein the model table, the Node_Class table and the Node table are linked to each other by a plurality of strong links which make use of the Row-ID of the respective table, each strong link defining one or more dependencies of data in a first set of one or more tables to data in a second set of one or more tables, each strong link defining the underlying structure of the hierarchical model.

19. The computer storage medium of claim 18,
wherein one or more of the different displays further comprises:
- two or more first level rectangular regions associated with each information technology organizational group represented in a highest level hierarchy of the model structure,
- one or more second level rectangular regions associated with specific functional areas, represented in a middle level hierarchy of the model structure, for which each respective information technology organization group is responsible, and
- one or more third level rectangular regions associated with specific applications, represented in a lowest level hierarchy of the model structure, that have been deployed in each respective functional area, and
wherein at least one of the third level rectangular regions, and at least one of the second level rectangular regions associated with the one third level rectangular region, are visually allocated to two or more adjacent first level rectangular regions.

* * * * *

UNITED STATES PATENT AND TRADEMARK OFFICE
CERTIFICATE OF CORRECTION

PATENT NO. : 7,664,729 B2  Page 1 of 1
APPLICATION NO. : 10/930716
DATED : February 16, 2010
INVENTOR(S) : Frederic M. Klein et al.

It is certified that error appears in the above-identified patent and that said Letters Patent is hereby corrected as shown below:

In column 31, line 58, in claim 11, delete "structured" and insert -- structured, --, therefor.

In column 32, line 10, in claim 12, delete "farther" and insert -- further --, therefor.

In column 33, line 18, in claim 19, delete "claim 18," and insert -- claim 15, --, therefor.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,664,729 B2
APPLICATION NO. : 10/930716
DATED : February 16, 2010
INVENTOR(S) : Klein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Thirtieth Day of November, 2010

David J. Kappos
*Director of the United States Patent and Trademark Office*